US012809827B2

(12) United States Patent
Jung et al.

(10) Patent No.: US 12,809,827 B2
(45) Date of Patent: Nov. 24, 2026

(54) METHOD OF ESTABLISHING PERSONALIZED DATABASE BASED ON ACTIVITY INFORMATION AND USER DEVICE USING THE METHOD

(71) Applicant: Samsung Electronics Co., Ltd., Suwon-si (KR)

(72) Inventors: Jinhe Jung, Suwon-si (KR); Sungwon Kim, Suwon-si (KR); Seunggyu Kong, Suwon-si (KR); Sangwoong Park, Suwon-si (KR); Sungmok Seo, Suwon-si (KR); Changhyup Oh, Suwon-si (KR); Hyungrai Oh, Suwon-si (KR); Yunsu Lee, Suwon-si (KR); Myunghee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/952,331

(22) Filed: Nov. 19, 2024

(65) Prior Publication Data

US 2025/0284667 A1 Sep. 11, 2025

Related U.S. Application Data

(63) Continuation of application No. PCT/KR2024/017541, filed on Nov. 7, 2024.

(30) Foreign Application Priority Data

Mar. 7, 2024 (KR) ........................ 10-2024-0032834

(51) Int. Cl.
*G06F 16/21* (2019.01)

(52) U.S. Cl.
CPC .................................. *G06F 16/211* (2019.01)

(58) Field of Classification Search
CPC ..................................................... G06F 16/211
See application file for complete search history.

(56) References Cited

U.S. PATENT DOCUMENTS 8,814,071 B2 8/2014 Jeker et al.
11,086,935 B2 8/2021 Bessiere et al.
(Continued)

FOREIGN PATENT DOCUMENTS

KR 10-1113690 B1 2/2012
KR 10-2015-0045774 A 4/2015
(Continued)

OTHER PUBLICATIONS

S. Egami et al., Synthesizing Event-Centric Knowledge Graphs of Daily Activities Using Virtual Space, IEEE Systems, Man and Cybernetics Society Section, Mar. 8, 2023, provided via IDS (hereinafter Egami) (Year: 2023).*
(Continued)

*Primary Examiner* — Tyler J Torgrimson
(74) *Attorney, Agent, or Firm* — Jefferson IP Law, LLP

(57) ABSTRACT

A method of establishing a personalized database based on activity information is provided. The method includes generating action information corresponding to a unit operation of a user, based on data obtained by a user device, determining the activity information corresponding to a sequence including a series of sequential pieces of action information, generating episode information based on a plurality of pieces of related activity information, and managing the generated episode information as a personalized knowledge graph, based on a pattern of the generated episode information.

17 Claims, 20 Drawing Sheets

(56) References Cited

U.S. PATENT DOCUMENTS

| | | | | |
|---|---|---|---|---|
| 12,111,864 | B2 | 10/2024 | Park et al. | |
| 12,412,195 | B2 | 9/2025 | Liu | |
| 2013/0304685 | A1 | 11/2013 | Kurata et al. | |
| 2015/0112975 | A1 | 4/2015 | Rhim | |
| 2015/0356135 | A1* | 12/2015 | Sanchez | G06N 5/022 707/763 |
| 2015/0370834 | A1* | 12/2015 | Smith | G06F 16/951 707/706 |
| 2016/0092474 | A1* | 3/2016 | Stojanovic | G06F 16/211 707/805 |
| 2016/0203137 | A1* | 7/2016 | Sabah | G06N 5/02 707/738 |
| 2017/0357644 | A1 | 12/2017 | Circlaeys et al. | |
| 2022/0207382 | A1 | 6/2022 | Chung et al. | |
| 2022/0215405 | A1* | 7/2022 | Chun | H04L 63/0815 |
| 2023/0169357 | A1 | 6/2023 | Lee et al. | |
| 2023/0325884 | A1 | 10/2023 | Liu | |
| 2023/0350862 | A1* | 11/2023 | Munuri | G06F 16/285 |
| 2024/0386015 | A1* | 11/2024 | Crabtree | G06F 16/9024 |
| 2025/0259085 | A1* | 8/2025 | Crabtree | G06N 5/01 |

FOREIGN PATENT DOCUMENTS

| | | | |
|---|---|---|---|
| KR | 10-2016-0140988 | A | 12/2016 |
| KR | 10-2018-0046124 | A | 5/2018 |
| KR | 10-2020-0089957 | A | 7/2020 |
| KR | 10-2020-0119391 | A | 10/2020 |
| KR | 10-2214422 | B1 | 2/2021 |
| KR | 10-2022-0093845 | A | 7/2022 |
| KR | 10-2023-0082186 | A | 6/2023 |
| KR | 10-2023-0089990 | A | 6/2023 |
| KR | 10-2747289 | B1 | 12/2024 |

OTHER PUBLICATIONS

Shusaku Egami, 'Synthesizing Event-Centric Knowledge Graphs of Daily Activities Using Virtual Space', IEEE Access (vol. 11), Mar. 14, 2023.

International Search Report dated Feb. 18, 2025, issued in an International Application No. PCT/KR2024/017541.

* cited by examiner

FIG. 8A

| ACTIVITY OR ACTION | TIME (StartTime, EndTime) |
|---|---|
| COMMUTINGTOWORK | 2022-12-23T08:12:45, 2022-12-23T09:05:12 |
| LISTENINGTOMUSIC | 2022-12-23T08:15:31 |
| COMMUTINGTOWORK | 2022-12-22T08:07:18, 2022-12-22T08:59:32 |
| ... | ... |
| COMMUTINGTOWORK | 2022-11-12T08:11:37, 2022-11-12T09:02:42 |

FIG. 8B

| PATTERN ID | ACTIVITY OR ACTION | DAY, (StartTime, EndTime), SCORE |
|---|---|---|
| PCW01 | COMMUTINGTOWORK | Weekdays, (08:10:37, 09:03:22), 0.92 |
| PCH02 | COMMUTINGTOHOME | Weekdays, (18:05:51, 19:21:07), 0.31 |
| | ... | ... |

FIG. 9

| PATTERN ID | ACTIVITY OR ACTION | DAY, (StartTime, EndTime), SCORE |
|---|---|---|
| PCW01 | COMMUTINGTOWORK | Weekdays, (08:10:37, 09:03:22), 0.92 |
| PCH02 | COMMUTINGTOHOME | Weekdays, (18:05:51, 19:21:07), 0.31 |
| | ... | ... |

→

| ROUTINE ID | TYPE | PATTERN CONTENT |
|---|---|---|
| R1 | DAILY | PCW01, PCH02 |
| R2 | WEEKLY | PC01, PW02 |
| R3 | PLACE | PPM01 |

FIG. 11

| PATTERN ID | ACTIVITY OR ACTION | DAY, (StartTime, EndTime), SCORE | VALIDATION TIME |
|---|---|---|---|
| PCW01 | COMMUTINGTOWORK | Weekdays, (08:10:37, 09:03:22), 0.92 | 2021-03-11, 2023-04-21 |
| PCW10 | COMMUTINGTOHOME | Weekdays, (07:30:12, 07:55:23), 0.93 | 2023-04-25 |

| ROUTINE ID | TYPE | PATTERN CONTENT |
|---|---|---|
| R1 | DAILY | PCW01, PCH02 |
| R10 | DAILY | PCW10, PCH20 |

FIG. 12

| PATTERN ID | ACTIVITY OR ACTION | (StartTime, EndTime), Score |
|---|---|---|
| PCW01 | COMMUTINGTOWORK | (08:10:37, 09:03:22), 0.92 |
| PCH01 | COMMUTINGTOHOME | (18:05:51, 19:21:07), 0.31 |
| PCH02 | COMMUTINGTOHOME | (21:12:32, 22:02:32), 0.27 |

| ROUTINE ID | TYPE | PATTERN CONTENT |
|---|---|---|
| R1 | DAILY | PCW01, PCH01, … |
| R2 | DAILY | PCW01, PCH02 |

METHOD OF ESTABLISHING PERSONALIZED DATABASE BASED ON ACTIVITY INFORMATION AND USER DEVICE USING THE METHOD

CROSS-REFERENCE TO RELATED APPLICATION(S)

This application is a continuation application, claiming priority under § 365(c), of an International application No. PCT/KR2024/017541, filed on Nov. 7, 2024, which is based on and claims the benefit of a Korean patent application number 10-2024-0032834, filed on Mar. 7, 2024, in the Korean Intellectual Property Office, the disclosure of which is incorporated by reference herein in its entirety.

TECHNICAL FIELD

The disclosure relates to a method of establishing a personalized database based on activity information and a user device using the method.

BACKGROUND

Artificial intelligence (AI)-based technologies have been used in a variety of fields across industries. Various AI models have been developed and used in many different fields, and cases of using an AI-based solution have been rapidly increasing in diverse industries, such as robotics, transport/logistics, the medical industry, education, the pharmaceutical/biological industry, or the like, as well as the manufacturing industry. Introductions of such AI-based technologies have been leading to enhanced competitiveness of corporations and nations.

In order to increase the performance of AI models, a knowledge base for training the AI models and for inference by the AI models may be used. An example of the knowledge base includes a knowledge graph having a resource structure in a graph form, and interest in establishing and using knowledge graphs has been rising.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an embodiment of the disclosure is to provide a method of establishing a personalized database based on activity information of a user based on data obtained by a user device and the user device using the method.

An embodiment of the disclosure will be set forth in part in the description which follows and, in part, will be apparent from the description, or may be learned by practice of the presented embodiments. In accordance with an embodiment of the disclosure, a method of establishing a personalized database based on activity information is provided. The method includes generating action information corresponding to a unit operation of a user, based on data obtained by a user device, determining the activity information corresponding to a sequence including a series of sequential pieces of action information, generating episode information based on a plurality of pieces of related activity information, and managing the generated episode information as a personalized knowledge graph, based on a pattern of the generated episode information.

In accordance with an embodiment of the disclosure, a computer-readable recording medium having recorded thereon a program for executing the method described above is provided.

In accordance with an embodiment of the disclosure, one or more non-transitory computer-readable storage media storing computer-executable instructions that, when executed by one or more processors individually or collectively, cause an electronic device to perform operations are provided. The operations include generating action information corresponding to a unit operation of a user, based on data obtained by a user device, determining activity information corresponding to a sequence comprising a series of sequential pieces of action information, generating episode information based on a plurality of pieces of related activity information, and managing the generated episode information as a personalized knowledge graph, based on a pattern of the generated episode information.

In accordance with an embodiment of the disclosure, a user device for establishing a personalized database based on activity information is provided. The user device includes memory storing one or more computer programs, and one or more processors communicatively coupled to the memory, wherein the one or more computer programs include computer-executable instructions that, when executed by the one or more processors individually or collectively, cause the user device generate action information corresponding to a unit operation of a user, based on data obtained by the user device, determine activity information corresponding to a sequence including a series of sequential pieces of action information, generate episode information based on a plurality of pieces of related activity information, and manage the generated episode information as a personalized knowledge graph, based on a pattern of the generated episode information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A is a diagram illustrating a plurality of pieces of activity information stored in episodic memory according to an embodiment of the disclosure;

FIG. 8B is a diagram illustrating episode information stored in personal semantic memory according to an embodiment of the disclosure;

FIG. 9 is a diagram illustrating generating routine information from episode information stored in personal semantic memory according to an embodiment of the disclosure;

FIG. 11 is a diagram illustrating managing homogeneous pieces of episode information having different patterns from each other in personal semantic memory according to an embodiment of the disclosure;

FIG. 12 is a diagram illustrating managing homogeneous pieces of episode information having a plurality of patterns having different probability distributions from each other in personal semantic memory, according to an embodiment of the disclosure;

The same reference numerals are used to represent the same elements throughout the drawings.

DETAILED DESCRIPTION

Figure 1:
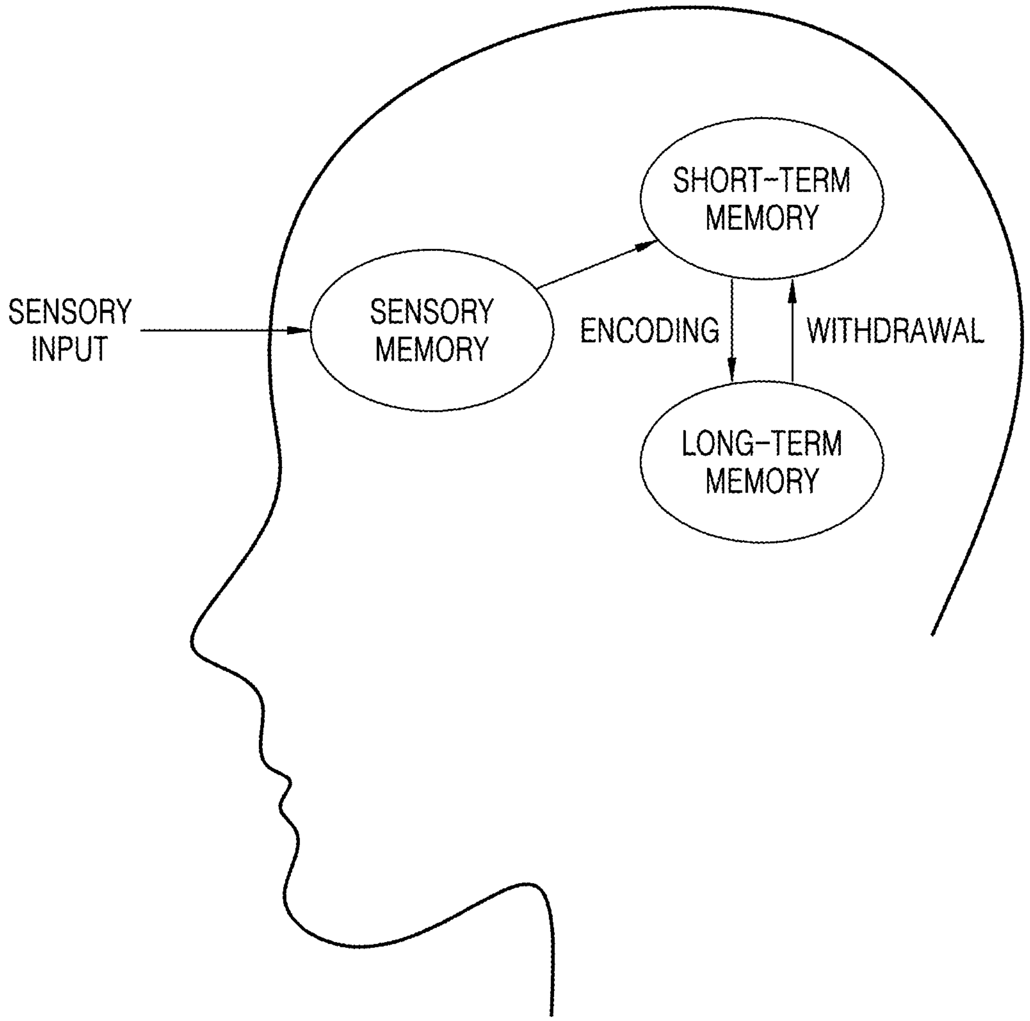
FIG. 1 is a diagram illustrating a multi-store model theory with respect to a memory system of a human being according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Throughout the disclosure, the expression “at least one of a, b or c” may indicate “a,” “b,” “c,” “a and b,” “a and c,” “b and c,” “all of a, b, and c,” or variations thereof.

The terms used in the disclosure are general terms as possible that have been widely used nowadays based on the functions in the disclosure, which, however, may be changed according to an intention of a technician in the art, a precedent, the advent of new technologies, or the like. In addition, particular cases may include terms arbitrary selected by an applicant, and in this case, the meaning of the terms will be described in detail in the corresponding description. Therefore, the terms used in the present disclosure should be defined based on the meanings of the terms and the content throughout the present disclosure, rather than simply based on the titles of the terms.

A singular expression may include a plural expression, unless an apparently different meaning is indicated in the context. The terms used herein including technical or scientific ones may have meanings that are the same as the meanings generally understood by one of ordinary skill in the art described in this specification. In addition, while the terms including an ordinal number, such as “first” or “second,” used in this specification may be used to describe various elements, these elements shall not be limited by those terms. These terms are used only for distinguishing one element from another element.

Throughout the specification, when a part “includes” or “comprises” an element, the part may further include other elements, rather than excluding the other elements, unless there is a particular description contrary thereto. In addition, terms, such as “portion,” “module,” or the like, described in the specification indicate a unit that processes at least one function or operation, and the unit may be embodied in a hardware manner, a software manner, or a combination of the hardware manner and the software manner.

Functions related to artificial intelligence (AI) according to the disclosure are performed through a processor and memory. The processor may include one or more processors. Here, the one or more processors may include a general-purpose processor, such as a central processing unit (CPU), an application processor (AP), a digital signal processor (DSP), or the like, a graphics-dedicated processor, such as a graphics processing unit (GPU) and a vision processing unit (VPU), or an AI-dedicated processor, such as a neural processing unit (NPU). The one or more processors may control input data to be processed according to a predefined operation rule or an AI model stored in the memory. Alternatively, when the one or more processors are AI-dedicated processors, the AI-dedicated processors may be designed to have hardware structures specialized for processing specific AI models.

The predefined operation rule or the AI model may be formed via learning. Here, to be formed through training denotes that a basic AI model is trained by using a plurality of pieces of training data through a training algorithm, so that a predefined operation rule or an AI model configured to perform a desired feature (or an objective) is formed. This learning operation may be directly performed by a device configured to execute the AI function according to the disclosure or may be performed by an additional server and/or an additional system. Examples of a learning algorithm may include, but is not limited to, supervised learning, unsupervised learning, semi-supervised learning, or reinforcement learning.

The AI model may include a plurality of neural network layers. The plurality of neural network layers may respectively have a plurality of weight values and may perform calculation using a calculation result of a previous layer and the plurality of weight values. The plurality of weight values owned by the plurality of neural network layers may be optimized by training results of the AI model. For example, the plurality of weight values may be updated to reduce or minimize a loss value or a cost value obtained by the AI model during a training procedure. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

In the disclosure, a "knowledge graph" is a way of managing and searching for knowledge information and may denote a knowledge base in a graph form, which is based on a knowledge base storing knowledge information and a graph represented to be analyzed through a network structure. The knowledge graph is a graph model in which the knowledge accumulated in the knowledge base is realized as a relationship of a node and an edge. The knowledge graph may be used to integrate data by using a graph data model, topology, or the like. In order to connect and integrate the knowledge by using the knowledge graph, a schema through ontology may be realized and a structure and a dictionary (terms) for sharing may be used.

Semantic information including commonsense and fact knowledge may be formed as a connection of the node and the edge, and with reference to the semantic information, various types of data may be converted into a knowledge graph form. Methods of representing the knowledge graph may include a labeled property graph (LPG) which may have an attribute of each of a node and an edge, a resource description framework (RDF) representing a relationship as a triple structure of a subject-predicate-object, or the like, but are not limited thereto. The knowledge graph may be generated by recognizing an entity from various pieces of data, linking (entity linking) the entity to an appropriate entity in a previous knowledge base, and extracting a relationship between the entities.

The knowledge graph may be used to improve AI performance. The knowledge graph may be used for a model, such as a graph neural network (GNN), a graph convolution neural network (GCN), or the like, and may be used to describe an explanation with respect to a result in explainable AI (XAI).

Hereinafter, an embodiment of the disclosure will be described in detail with reference to the accompanying drawings, so that the embodiment of the disclosure may be easily implemented by one of ordinary skill in the art. However, the disclosure may have different forms and should not be construed as being limited to the embodiment of the disclosure described herein.

Hereinafter, the disclosure is described in detail with reference to the accompanying drawings.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a diagram illustrating a multi-store model theory with respect to a memory system of a human being according to an embodiment of the disclosure.

The multi-store model theory explains that a memory system is formed of a plurality of memory storages. According to the multi-store model theory, the memory is formed as a triple structure including sensory memory, short-term memory, and long-term memory. Via perception of a human being, information may briefly remain in the sensory memory and disappear. Of the information remained in the sensory memory, information on which a human being concentrated attention can be stored in the short-term memory. Of the information in the short-term memory, repeated information can be stored in the long-term memory. Alan Baddeley presented a working memory corresponding to the short-term memory and specifically described the working memory as a space-time note, a phoneme circuit, a central executor, or the like.

Referring to FIG. 1, the sensory memory stores information based on a sensory input, only for a very short moment. The time period of retaining information may vary for each sensory area of a human being. For example, information input through a visual sense may be retained for a second, and information input through an auditory sense may be retained for about two seconds. The short-term memory processes and stores information on which attention is placed of the information stored in the sensory memory. The sensory memory has a limited capacity and retention period. When the information in the short-term memory is repetitively learned, the information may be transmitted to and stored in the long-term memory through encoding. The long-term memory has no limit in capacity and retention period. The information stored in the long-term memory may be withdrawn and used.

Figure 2:
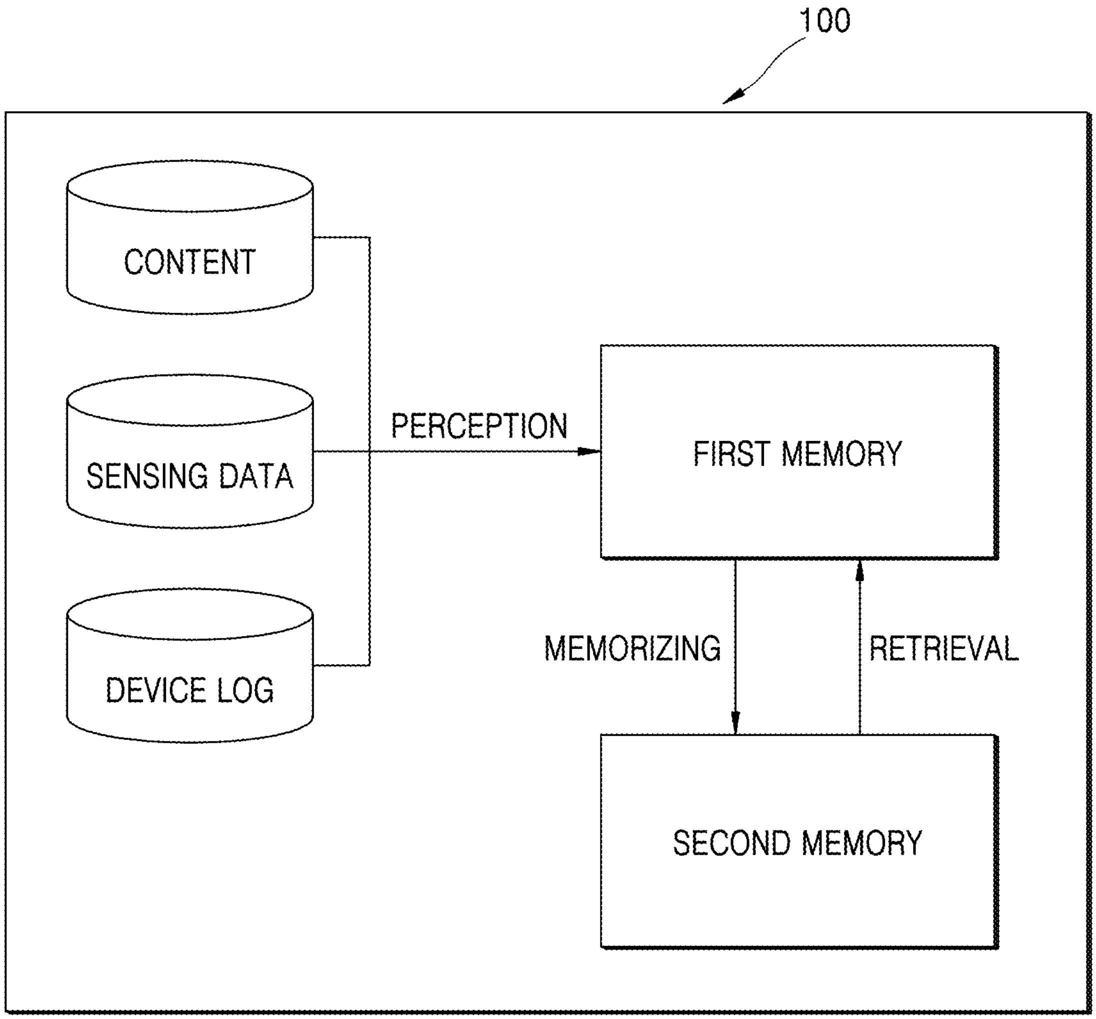
FIG. 2 is a diagram illustrating a multi-memory-based operation of a user device according to an embodiment of the disclosure.

FIG. 2 is a diagram illustrating a multi-memory-based operation of a user device 100 according to an embodiment of the disclosure.

Following the multi-store model with respect to the memory system of the human being described in FIG. 1, the user device 100 according to an embodiment of the disclosure may include a plurality of memories for storing information. The user device 100 may include an electronic device capable of processing data. For example, the user device 100 may include an electronic device, such as a smartphone, smart glasses, a wearable device, a digital camera, a notebook computer, an augmented reality (AR) device, a virtual reality (VR) device, or the like. The user device 100 may be loaded with various types of neural network models. For example, the user device 100 may be loaded with at least one of models, such as a CNN, a GCN, a GNN, a DNN, an RNN, and a BRDNN, or may use the models in combination.

Referring to FIG. 2, the user device 100 may include first memory and second memory to obtain and manage various types of data. The first memory may correspond to short-term memory and may include working memory. The first memory may store and manage a level of information corresponding to the short-term memory of a human being. The second memory may correspond to a long-term memory and may include persistent memory. The second memory may store and manage a level of information corresponding to the long-term memory. For example, the second memory may include semantic memory storing and managing semantic information corresponding to the common sense or fact knowledge. The second memory may include personal semantic memory storing and managing a personalized knowledge base. The second memory may include episodic memory for accumulating a plurality of pieces of activity information and managing the plurality of pieces of activity information that are related to each other. Each of the first memory and the second memory may include, for each purpose, a plurality of memories that are different from each other.

Defined information may be derived from data obtained by the user device 100. The data obtained by the user device 100 may be stored in the user device 100 in the form of metadata with respect to content, such as text, picture, image, music, or the like, or as data corresponding to the time or place related to the content. The data obtained by the user device 100 may be stored in the user device 100 in the form of sensing data sensed from at least one sensor. The data obtained by the user device 100 may be stored in the user device 100 in the form of metadata or use log data with respect to a used application or of log data with respect to time or place of an event occurrence, or the like.

The user device 100 may process and store amorphous data obtained by the user device 100 as information in a standardized form. Referring to FIG. 2, the user device 100 may prepare, in the second memory, semantic information in a standardized form. Like the data input through a sensory area is perceived through the common sense or empirical facts of which a human being was previously aware, the user device 100 may refer to the semantic information in the standardized form stored in the second memory, to process amorphous data obtained by the user device 100 as information in a standardized form and store the data processed as the information in the standardized form in the first memory. For example, the user device 100 may store various types of amorphous data in the first memory by converting the data into a form of a knowledge graph.

For example, the user device 100 may collect information with respect to a content consumption history, act, or the like of a user from data with respect to contents played on the user device 100 or an application used by the user device 100 and may store, in the first memory, the collected information in the form of the knowledge graph. The user device 100 may speculate environmental information or context information from the sensing data sensed by the user device 100 and may store the speculated information in the first memory as a knowledge graph. The user device 100 may infer information with respect to an experience, pattern, habit, or the like of a user from the log data stored in the user device 100 and may store the inferred information in the first memory as a knowledge graph.

Hereinafter, aspects about a technique for storing data obtained by the user device 100 in a personal user-friendly manner and extracting the data will be described, with reference to a technique for managing user's personal information and establishing a personalized knowledge base based on the data obtained by the user device 100 and the personalized knowledge base.

Figure 3:
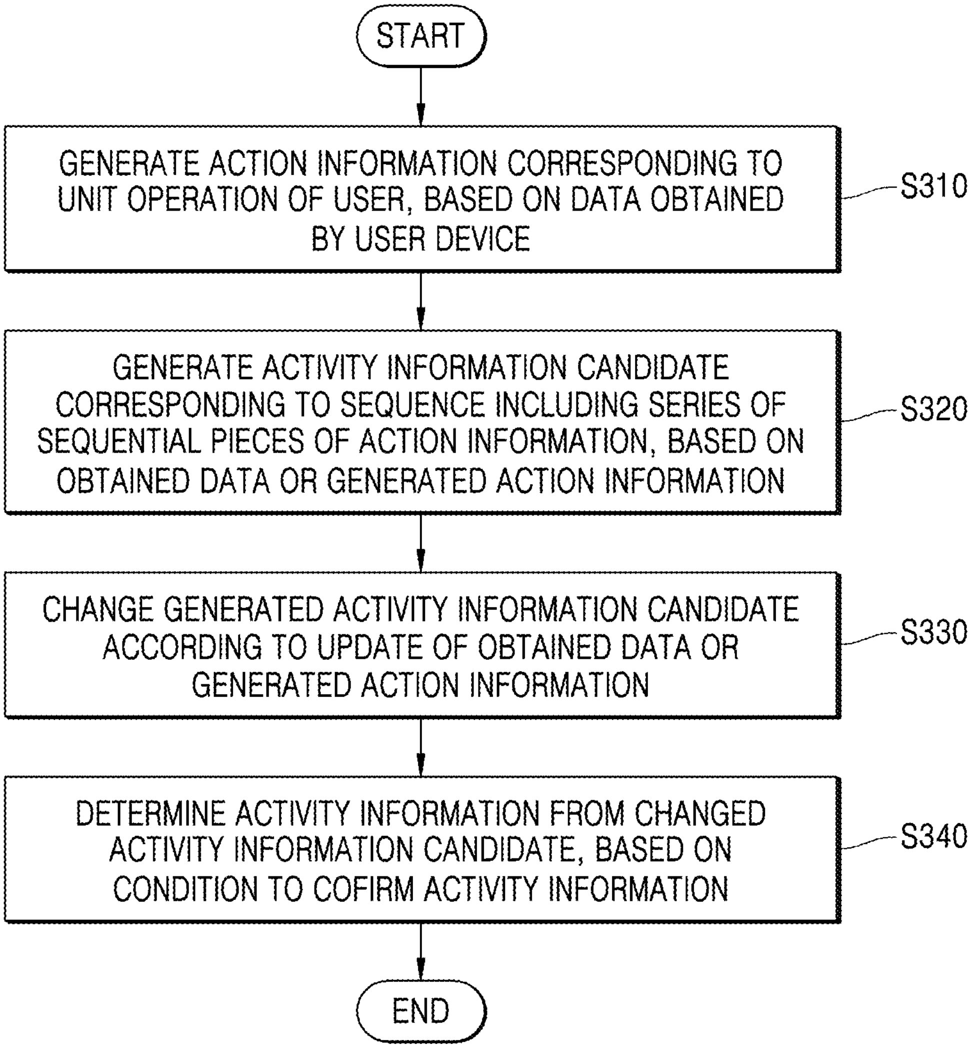
FIG. 3 is a flowchart of a method of managing activity information in a user device according to an embodiment of the disclosure.

FIG. 3 is a flowchart of a method of managing activity information in a user device 100 according to an embodiment of the disclosure.

The user device 100 may manage personal information of a user and establish a personalized knowledge base, based on data obtained by the user device 100. For example, the user device 100 may manage activity information of the user based on the data obtained by the user device 100.

Referring to FIG. 3, in operation S310, the user device 100 may generate action information corresponding to a unit operation of the user, based on the data obtained by the user device 100. The data obtained by the user device 100 may include data input by a user into the user device 100, data sensed by the user device 100, data received by the user device 100 from the outside, data processed by the user device 100, or the like. For example, the data input by the user into the user device 100 may include data input for controlling, selecting, manipulating, and outputting operations, or the like, in the user device 100. The data sensed by the user device 100 may include sensing data sensed by at least one sensor provided in the user device 100 and may include the sensing data sensed by at least one of a camera, a light detection and ranging (LiDAR) sensor, an infrared sensor, an ultrasonic sensor, a time of flight (ToF) sensor, a gyro sensor, a brightness sensor, a hall sensor, a motion sensor, a temperature sensor, a humidity sensor, a proximity sensor, a global positioning system (GPS) sensor, or the like provided in the user device 100. The data received by the user device 100 from the outside may include data received from an external device through a communication interface. The data processed by the user device 100 may include data related to an application or a program executed in the user device 100 or data, such as content processed by executing the application or the program.

The user device 100 may generate action information corresponding to a unit operation of a user from the data obtained by the user device 100. The data obtained by the user device 100 may be related to an operation actually performed by the user. The operation actually performed by the user may be divided into defined unit operations respectively corresponding to levels and may be processed. The user device 100 may extract the action information matched to the unit operation of the user analyzed based on the data obtained by the user device 100, from an action information database of a knowledge graph. The action information may correspond to a value stored in the action information database of the knowledge graph to be matched to the unit operation of the user analyzed based on the data obtained by the user device 100. The action information may be information indicating a motion of the user performed in a relatively short period of time of about several seconds to about several minutes. The action information may be a basic unit of a user's motion event and may be mapped with context information, such as the time, place, weather, or the like, relating to the occurrence. The user device 100 may generate the action information that is relatively more associated with an operation actually performed by the user, by taking into account the context information together with the unit operation of the user. For example, the user device 100 may analyze the unit operation of the user of "executing an electronic (e)-book application" by obtaining data with respect to a user's input event on a touch screen, a coordinate of a touch position on the touch screen, and whether or not the e-book application is executed. The user device 100 may use the action information database of the knowledge graph to extract the action information of "starting book reading" matched to "executing the e-book application," which is the analyzed unit operation of the user.

As another example, the user device 100 may analyze the unit operation of the user of "user moving" by obtaining data with respect to wi-fi connection/disconnection and a GPS signal change. The user device 100 may use the action information database of the knowledge graph to extract the action information of "leaving home" matched to "user moving," which is the analyzed unit operation of the user.

The unit operation of the user and the action information may have a many-to-many mapping relationship. For example, the unit operation of "executing the e-book application" may be mapped not only to "starting book reading," but also to a plurality of pieces of action information, such as "starting studying," "taking a rest," or the like. In addition, the action information of "taking a rest" may be mapped not only to "executing the e-book application," but also to a plurality of unit operations, such as "executing a video," "executing a game," or the like.

The user device 100 may extract each piece of action information from the action information database of the knowledge graph, based on each unit operation of the user analyzed based on the data obtained by the user device 100. For example, during a process in which user A departs from home and gets in a car and drives to an office, the user device 100 may obtain various types of data and generate the action information which may be matched to the unit operation of the user. With respect to a chronological sequence, the user device 100 may analyze a user's motion (unit operation) based on the disconnection from a wi-fi router installed in a user's house and may be aware that the user has left home (action). Thus, the user device 100 may generate first action information of "leaving home." Through a communication connection with a vehicle, the user device 100 may be aware that the user has got in the car. Thus, the user device 100 may generate second action information of "getting in a car." The user device 100 may be aware that the user is driving, by sensing, through a GPS, a change in user's position information. Thus, the user device 100 may generate third action information of "controlling the car." The user device 100 may be aware that the user has arrived at the office, by sensing, through the GPS, that the car has reached a location within a defined range from office location information previously registered. Thus, the user device 100 may generate fourth action information of "arriving at the office."

According to an embodiment of the disclosure, the user device 100 may extract action information matched to a unit operation of a user based on data obtained by the user device 100, from an action information database of a pre-established knowledge graph. The user device 100 may determine the extracted action information as the action information corresponding to the unit operation of the user. The action information database of the pre-established knowledge graph may be stored in the second memory (e.g., the semantic memory). The user device 100 may manage the generated action information in the first memory (e.g., the working memory).

For example, the user device 100 may compare an embedding vector of the unit operation of the user based on the data obtained by the user device 100 with an embedding vector of one or more action information candidates in the action information database of the pre-established knowledge graph. Based on a result of the comparison between the embedding vectors, the user device 100 may perform classification of the action information with respect to the unit operation of the user. Through the classification of the action information with respect to the unit operation of the user, the action information matched to the unit operation of the user may be extracted from the action information database of the pre-established knowledge graph.

According to an embodiment of the disclosure, when first action information is generated, the user device 100 may infer second action information according to time information or place information based on the obtained data, to generate the action information. The user device 100 may manage the generated action information in the first memory (the working memory).

For example, when the time at which a user arrives at the office is the attendance time slot, the user device 100 may infer the starting of work by the user to generate the action information of "starting to work." In the action information database of the pre-established knowledge graph, a connection relationship among the first action information of "arriving at the office," the time information of "the attendance time slot," and the second action information of "starting to work" is pre-defined. Here, in the process of generating the action information, the action information may be generated by setting a reliability section based on a history of the user. When the user always performs an action of "X" at a defined time slot, the reliability section with respect to the action of "X" may be set to have a high value for the corresponding defined time slot. However, even though the user always arrives at the office at around 7 o'clock, to generate the action information of "starting to work" when the user arrives at the office at 10 o'clock, the reliability section with respect to the "attendance time slot" may be set to have a low value. As another example, when a place at which the user eats is a restaurant, the user device 100 may infer that the user eats out to generate the action information of "eating out." In the action information database of the pre-established knowledge graph, a connection relationship among the first action information of "eating," the place information of "the restaurant," and the second action information of "eating out" is pre-defined.

Figure 4A:
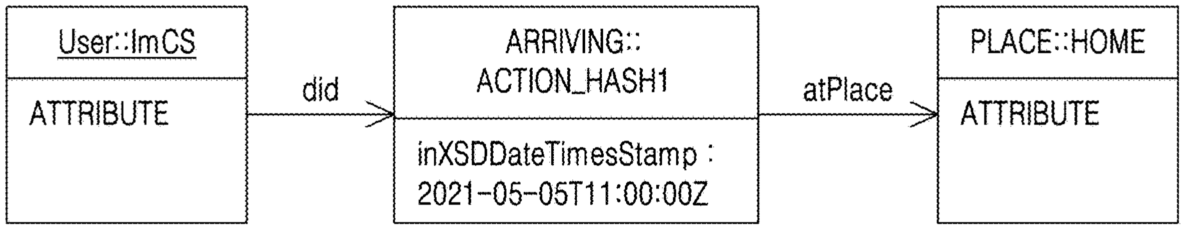
FIGS. 4A, 4B, and 4C are diagrams illustrating action information in a form of a knowledge graph according to an embodiment of the disclosure.
Figure 4B:
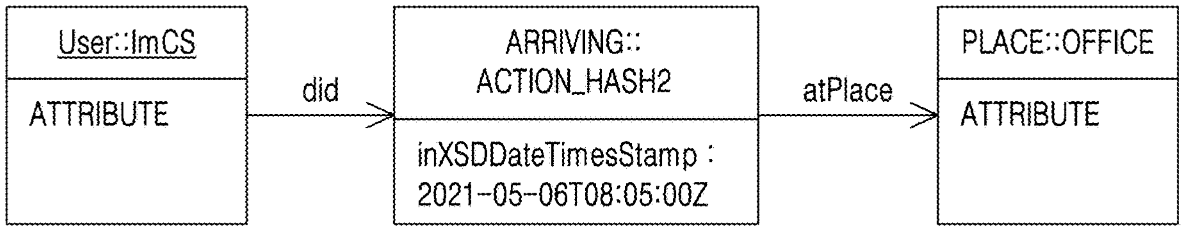
Figure 4C:
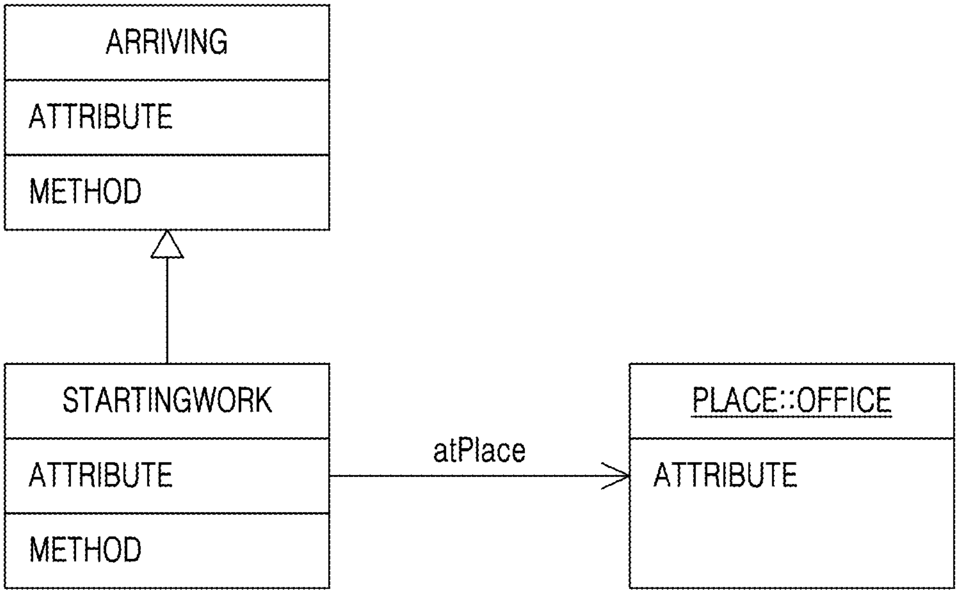

FIGS. 4A, 4B, and 4C are diagrams illustrating action information in a form of a knowledge graph according to an embodiment of the disclosure.

Data obtained by the user device 100 may be converted into the action information based on semantic information in the form of a knowledge graph and may be stored in a working memory in the form of the knowledge graph. The semantic information may be stored in semantic memory in the form of the knowledge graph formed of a connection of a node and an edge. The action information may be generated as the knowledge graph formed of the node and the edge and each of the node and the edge may have an attribute.

Referring to FIG. 4A, the action information of "leaving home" is represented as a knowledge graph. The action information may be stored in the working memory in the form of "a user did an action." The action information of "leaving home" may be formed of a node about a "user," a node about an "action," and a node about a "place," and each node may have a value with respect to the attribute. Referring to FIG. 4B, the action information of "arriving at the office" is represented as a knowledge graph. The action information initially generated may be referred to as a primitive action or a top action.

Referring to FIG. 4C, in an action information database of a pre-established knowledge graph, a connection relationship of the first action information of "arriving at the office," the time information of "the attendance time slot," and the second action information of "starting of work" may be pre-defined. According to this connection relationship of the action information database of the pre-established knowledge graph, when the time at which a user arrives at the office is the attendance time slot, the action information of "starting of work" may be dynamically generated by inferring that the user starts working at the office, and the dynamically generated action information may be stored in the working memory.

Referring to FIG. 3 again, in operation S320, the user device 100 may generate an activity information candidate corresponding to a sequence including a series of sequential pieces of action information, based on the obtained data or the generated action information. Activity information may correspond to a behavior corresponding to a sequence formed of a series of chained pieces of action information. The activity information may denote a behavior inferred based on a set of pieces of action information. One piece of activity information may be generated according to a sequence of sequential pieces of action information. The activity information may have a start time and an end time and may have start action information and end action information. The activity information candidate may correspond to the activity information not completed and may correspond to a behavior corresponding to a sequence reflecting recent action information. The activity information may have the start time and the end time, and thus, may distinguish whether an activity is currently ongoing or was completed in the past. The ongoing activity may be represented in the form of "a user does an activity," and the completed activity may be represented in the form of "a user did an activity."

Figure 5A:
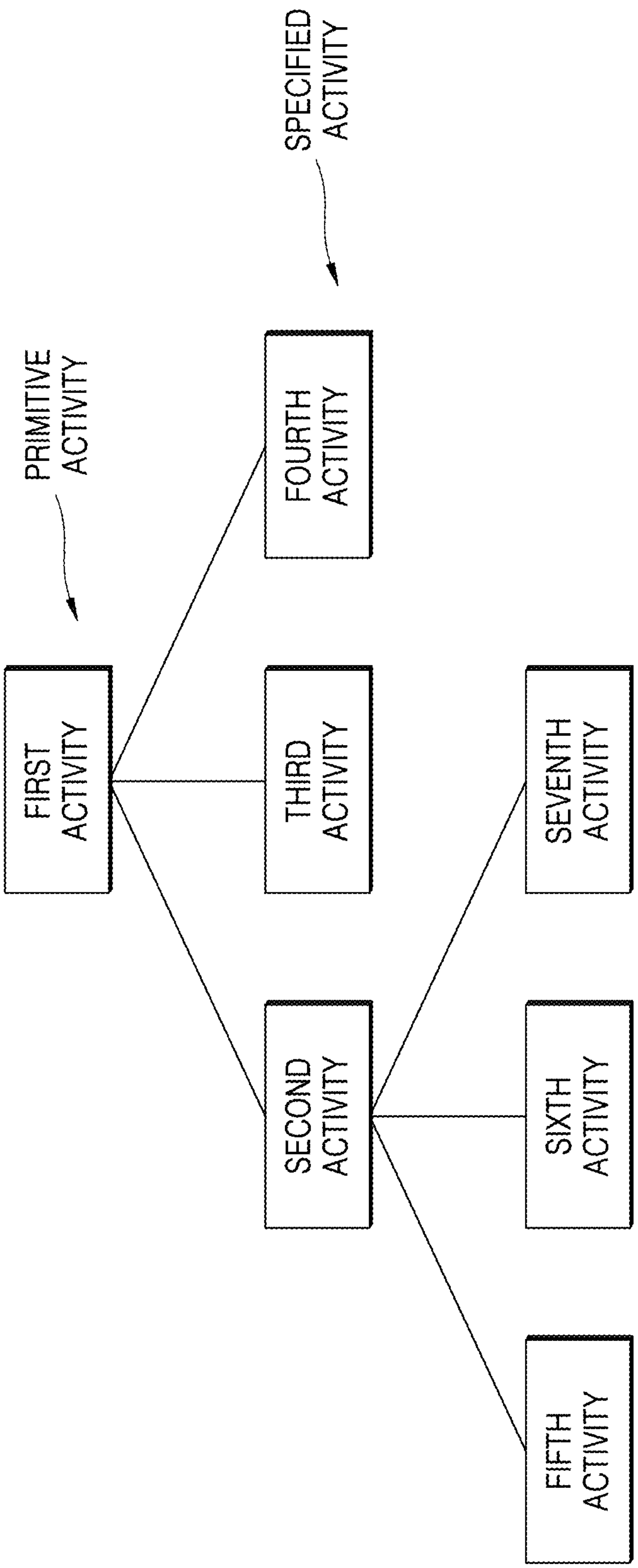
FIGS. 5A and 5B are diagrams illustrating activity information and an activity information database according to an embodiment of the disclosure.
Figure 5B:
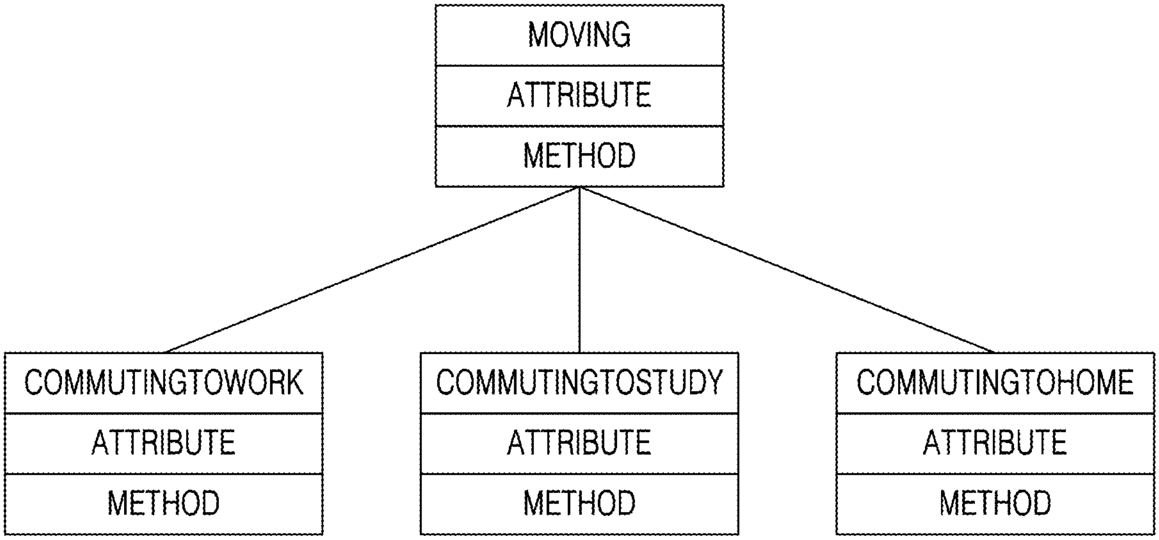

FIGS. 5A and 5B are diagrams illustrating activity information and an activity information database according to an embodiment of the disclosure.

Referring to FIG. 5A, a hierarchical structure of the activity information database is represented. In the activity information database, layers in which pieces of activity information are arranged may be determined according to higher and lower concepts between the pieces of activity information. As illustrated in FIG. 5A, first activity information may be activity information corresponding to the highest concept and may correspond to primitive activity information. Each of second activity information, third activity information, and fourth activity information may correspond to activity information specified from the first activity information and may correspond to a lower concept than the first activity information so as to be arranged in a lower layer than the first activity information. Each of fifth activity information, sixth activity information, and seventh activity information may correspond to activity information further specified from the second activity information and may correspond to a lower concept than the second activity information so as to be arranged in a lower layer than the second activity information. The activity information including a sequence of pieces of action information may be determined from the activity information database, according to data or action information obtained or generated by the user device 100.

The activity information of the higher concept and the activity information of the lower concept may be in an inheritance relationship. The activity information of the higher concept may bequeath an attribute and a method of the activity information of the higher concept to the activity information of the lower concept. The attribute or the method of the activity information of the higher concept may be likewise applied to an attribute or a method of the activity information of the lower concept. In FIG. 5A, the attribute of the second activity information may be likewise applied to the attribute of each of the fifth activity information, the sixth activity information, and the seventh activity information, and when the attribute of the second activity information is updated, the attribute of each of the fifth activity information, the sixth activity information, and the seventh activity information may also be updated.

Referring to FIG. 5B, it is defined in the semantic memory that the primitive activity information of "moving" is activity information corresponding to a sequence including start action information of "leaving some place" and end action information of "arriving at some place." Thus, when the end action information of "arriving at some place" occurs after the start action information of "leaving some place" occurs, the activity information of "moving" may be determined. When the end action information of "arriving at the office" occurs after the start action information of "leaving home" occurs, the activity information of "commuting to work" may be determined, and when the end action information of "arriving at school" occurs after the start action information of "leaving home" occurs, the activity information of "commuting to school" may be determined.

When the attribute with respect to a start time of the attribute of the activity information of "moving" is "2 p.m.," the attribute of the activity information of "commuting to work," which is a lower concept of the activity information of "moving," may be "2 p.m." When the activity information of "moving" has a relationship of "at place" with place information, the activity information of "commuting to work," which is the lower concept of the activity information of "moving," may also have a relationship of "from" with a place of the place information and the attribute in its lower relation.

Referring to FIG. 3 again, according to an embodiment of the disclosure, the user device 100 may generate the activity information candidate by using the activity information database of a pre-established knowledge graph, according to the data or the action information obtained or generated by the user device 100. For example, an activity information candidate generation model may use the obtained data or the generated action information as an input and may generate the activity information candidate based on the activity information database of the pre-established knowledge graph. The activity information database of the pre-established knowledge graph may be stored in the second memory (the personal semantic memory or the semantic memory). In the semantic memory, the activity information database of the knowledge graph, which is pre-defined based on semantic information (the common sense or fact knowledge), may be stored. In the personal semantic memory, the activity information database of a personalized knowledge graph, which is inductively defined based on information related to a user's personal event, may be stored. Inductive activity information may be custom activity information inductively defined based on an action sequence frequently performed by a user. The user device 100 may manage the generated activity information candidate in the first memory (the working memory).

According to an embodiment of the disclosure, the user device 100 may extract activity information including a sequence of one or more pieces of action information, from the activity information database of the pre-established knowledge graph, when the one or more pieces of action information is generated according to the obtained data or the generated action information. For example, when first action information is generated, the user device 100 may extract the activity information including the sequence of the first action information, from the activity information database of the pre-established knowledge graph. The user device 100 may determine the extracted activity information as the activity information candidate corresponding to a sequence of one or more pieces of action information.

In the example of the action information described above with respect to operation S310, the user device 100 may extract the activity information including the sequence of the first action information, from the first action information of "leaving home." According to this, the user device 100 may generate the activity information of "moving" as the activity information candidate.

In operation S330, the user device 100 may change the generated activity information candidate according to an update of the obtained data or the generated action information. The activity information candidate may be dynamically changed according to an updated sequence.

According to an embodiment of the disclosure, the user device 100 may change the activity information candidate by using the activity information database of the pre-established knowledge graph, according to an update of the obtained data or the generated action information. For example, the activity information candidate generation model may use the updated data or action information as an input and may renew the activity information candidate based on the activity information database. The activity information database of the pre-established knowledge graph may be stored in the second memory (the personal semantic memory or the semantic memory). The user device 100 may manage the changed activity information candidate in the first memory (the working memory).

According to an embodiment of the disclosure, according to an update of the data or the action information obtained or generated by the user device 100, the user device 100 may extract, from the activity information database of the pre-established knowledge graph, the activity information including the sequence of the action information reflecting the update. The user device 100 may determine the extracted activity information as the activity information candidate corresponding to the sequence of the action information reflecting the update. The user device 100 may renew the activity information candidate before the update of the data or the action information obtained or generated by the user device 100 with the extracted activity information.

For example, based on the activity information database of a hierarchical structure in which layers for arranging pieces of activity information are determined according to higher and lower concepts between the pieces of activity information, the user device 100 may extract the activity information including the sequence of the action information reflecting the update, as the activity information of a higher concept is specified as the activity information of a lower concept, according to the update of the data or the action information obtained or generated by the user device 100.

In the activity information database of the hierarchical structure, the activity information of a higher concept may be arranged in a higher layer, and the activity information of a lower concept may be arranged in a lower layer. A pointer (a cursor) may be located with respect to each of one or more pieces of activity information including the sequence of the action information in the latest state. The activity information at which the pointer (the cursor) is located may become the activity information candidate. According to the update of the data or the action information obtained or generated by the user device 100, the user device 100 may determine whether it is possible to move each of the one or more pointers (cursors) indicating the activity information to the activity information of the lower concept in the lower layer. When the activity information at which the pointer (cursor) is located is changed according to the movement of the pointer (cursor), the activity information candidate may be changed.

In the example of the action information described above with respect to operation S310, as the action information of "leaving home," the action information of "getting in a car," and the action information of "controlling the car," that is, the first action information to the third action information, are updated, the user device 100 may change the activity information including the sequence of the action information reflecting the update of up to the third action information, as the activity information candidate. According to this, the user device 100 may determine the activity information of "commuting to school," "commuting to work," or the like as the activity information candidate.

In operation S340, the user device 100 may determine the activity information from the changed activity information candidate, based on a condition to confirm the activity information. When the activity information is determined, the user device 100 may store the determined activity information in the second memory (the episodic memory) and manage the determined activity information. When the activity information is determined, the user device 100 may delete the activity information candidate managed by the first memory (the working memory), which is related to the determined activity information.

According to an embodiment of the disclosure, the user device 100 may determine the activity information from the activity information candidate for which the end action information is generated. In the example of the action information described above with respect to operation S310, as the action information of "leaving home," the action information of "getting in a car," the action information of "controlling the car," and the action information of "arriving at the office," that is, the first action information to the fourth action information, are updated, the user device 100 may extract, from the pre-established activity information database, the activity information including the sequence of the action information reflecting the update of up to the fourth action information. Here, because the fourth action information is the end action information of the activity information of "commuting to work," the user device 100 may determine the activity information as "commuting to work."

According to an embodiment of the disclosure, the user device 100 may infer the activity information from an activity information candidate whose probability, which corresponds to the similarity with the activity information based on the degree of progress of the sequence, satisfies a defined condition, of the changed activity information candidate. The user device 100 may obtain the probability corresponding to the similarity with the activity information, based on the degree of progress of the sequence of the action information reflecting the update of the whole sequence of the activity information, according to the update of the data or the action information obtained or generated by the user device 100. When the probability corresponding to the similarity with the activity information exceeds a defined threshold value, the user device 100 may infer the activity information from the activity information candidate.

Figure 6A:
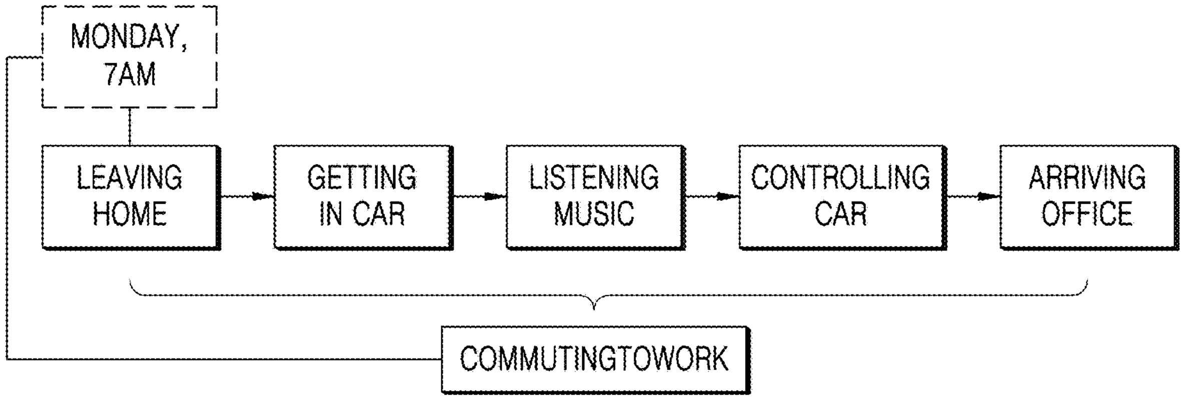
FIG. 6A is a diagram illustrating activity information corresponding to a whole sequence according to an embodiment of the disclosure.

FIG. 6A is a diagram illustrating activity information corresponding to a whole sequence according to an embodiment of the disclosure.

Referring to FIG. 6A, the activity information of "commuting to work" may correspond to the whole sequence including the action information of "leaving home" having an attribute (indicated by a dotted box in FIG. 6A) of a start time of "Monday morning 7 o'clock," and the action information (indicated by a solid box in FIG. 6A) of "getting in a car," "listening to music," "controlling the car," and "arriving at the office." When the end action information of "arriving at the office" is generated, the activity information of "commuting to work" corresponding to the whole sequence may be determined.

Figure 6B:
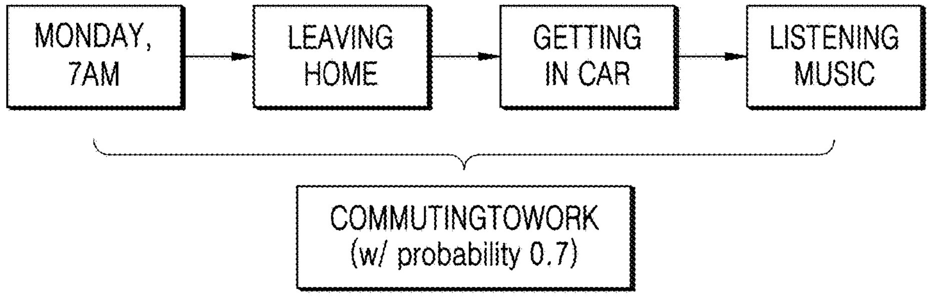
FIG. 6B is a diagram illustrating a method of inferring activity information from an activity information candidate corresponding to some sequences according to an embodiment of the disclosure.

FIG. 6B is a diagram illustrating a method of inferring activity information from an activity information candidate corresponding to a partial sequence according to an embodiment of the disclosure.

Referring to FIG. 6B, according to an update of the action information of "listening to music," there is the activity information candidate corresponding to the partial sequence including the action information of "leaving home", "getting in a car," and up to "listening to music," together with the time information of "Monday morning 7 o'clock." The user device 100 may identify that the probability corresponding to the similarity with the activity information corresponding to the whole sequence is 0.7, based on the degree of progress of the partial sequence of the activity information candidate. When the probability corresponding to the similarity with the activity information exceeds a defined threshold value, the user device 100 may infer the activity information of "commuting to work."

Figure 7:
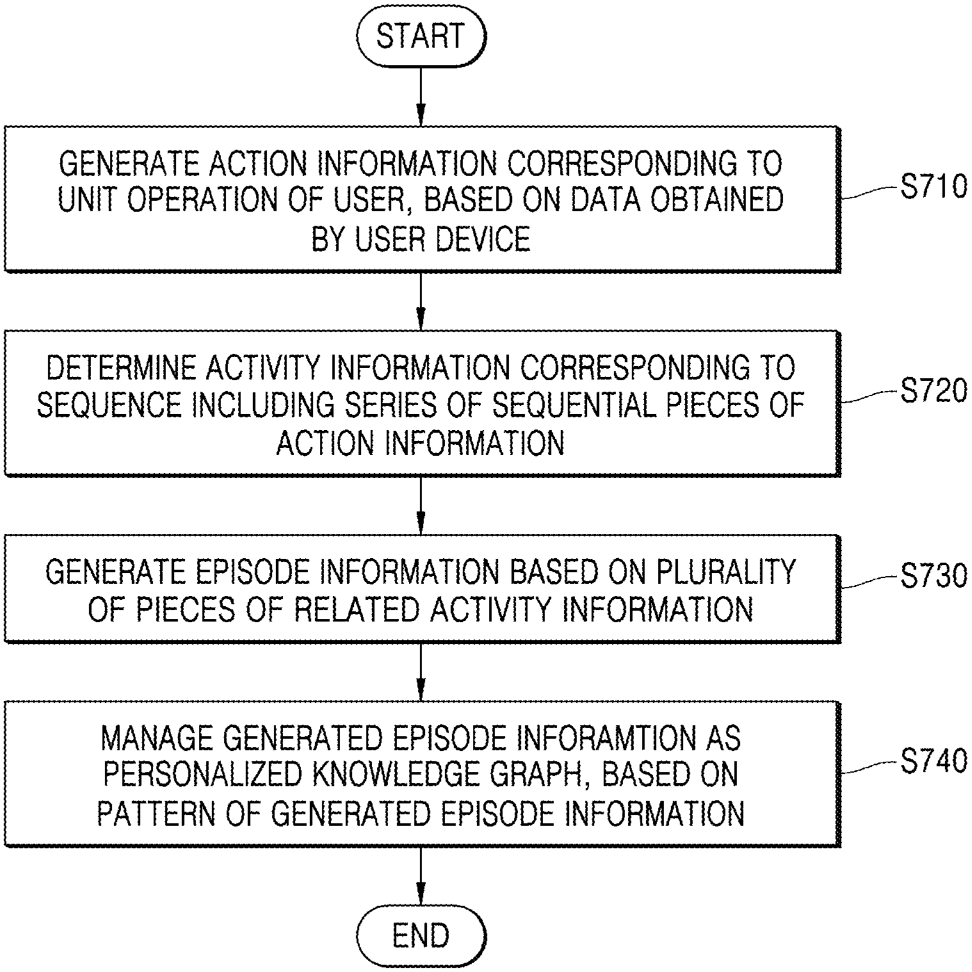
FIG. 7 is a flowchart of a method of establishing an activity information-based personalized database in a user device according to an embodiment of the disclosure.

FIG. 7 is a flowchart of a method of establishing a personalized database based on activity information, in a user device 100 according to an embodiment of the disclosure.

The user device 100 may manage personal information of a user based on data obtained by the user device 100 and establish a personalized knowledge base based on the managed personal information. For example, the user device 100 may establish the personalized knowledge base based on activity information of the user managed by the user device 100. The user device 100 may store information based on the data obtained by the user device 100 in a manner friendly to a personal user, with reference to a personalized knowledge graph, and subsequently, the user may easily extract the stored information.

Referring to FIG. 7, in operation S710, the user device 100 may generate action information corresponding to a unit operation of the user, based on the data obtained by the user device 100. For operation S710 of FIG. 7, the description with respect to operation S310 of FIG. 3 may be likewise used, and thus, a detailed description is omitted hereinafter.

In operation S720, the user device 100 may determine the activity information corresponding to a sequence including a series of sequential pieces of action information. For operation S720 of FIG. 7, the description with respect to operations S320 to S340 of FIG. 3 may be likewise used, and thus, a detailed description is omitted hereinafter.

The user device 100 may determine the activity information corresponding to the sequence, by using an activity information database inductively defined based on information related to a user's personal event, stored in personal semantic memory, or an activity information database predefined based on semantic information (the common sense or fact knowledge), stored in semantic memory. The activity information database of the personalized knowledge graph may be established in the personal semantic memory.

In order to determine the activity information, the user device 100 may store and manage information by using working memory. The working memory may be used to track the activity information in a currently ongoing state based on a sequence including a series of successive pieces of action information. When a start action occurs, the user device 100 may load, in the working memory, and track the activity information in the ongoing state, and as an end action occurs, the user device 100 may delete the completed activity information from the working memory.

The user device 100 may delete the completed activity information from the working memory and may store and manage the completed activity information by using the episodic memory and the personal semantic memory as described with respect to operations S730 and S740.

In operation S730, the user device 100 may generate episode information based on a plurality of pieces of activity information related to each other. The user device 100 may store, in the episodic memory, the completed activity information deleted from the working memory. A plurality of pieces of activity information may be stored in the episodic memory.

The user device 100 may generate the episode information based on the plurality of pieces of activity information that are related to each other from among the plurality of pieces of activity information stored in the episodic memory. The connection among the pieces of activity information may be determined based on the type of the activity information or the sequence corresponding to the activity information. For example, the same types of activity information may be determined to be related to each other. As another example, when a first sequence corresponding to first activity information and a second sequence corresponding the second activity information correspond to each other by a defined degree or higher, the first activity information and the second activity information may be determined to be related to each other. When start action information and end action information of the first activity information are the same as start action information and end action information of the second activity information, and some pieces of action information included in the first and second sequences overlap each other, the first activity information and the second activity information may be determined to be related to each other. In addition, when attributes of information associated with the two pieces of activity information or of the action information included in the two pieces of activity information are similar with each other, the two pieces of activity information may be determined to be related to each other. For example, in the case of commuting to work, mandatory attendance time is defined, and the time of leaving home is commonly consistent as early morning, and thus, the activity information of "commuting to work" may use the similarity of the time attribute as a reference to determine the connection between the pieces of activity information.

The episode information is the representative information of the plurality of pieces of related activity information. The episode information may be generated by using the activity information accumulated during a defined period of time as a population, analyzing rules, features, values, or the like, corresponding to the attributes of the plurality of pieces of related activity information, deriving the common attributes with respect to the plurality of pieces of related activity information as patterns, and determining reliability values with respect to the patterns. The patterns may be derived based on the sequence of the plurality of pieces of action information and the attributes of the plurality of pieces of action information and may be represented as defined parameter values. From the plurality of pieces of related activity information accumulated in the episodic memory, the episode information based on the parameter value corresponding to the pattern may be generated, based on the common action information and the attribute (for example, data with respect to the time, place, and content) of each piece of action information. The user device 100 may generate the episode information by deriving the common attribute with respect to the plurality of pieces of related activity information as the pattern and determining the reliability value with respect to the pattern.

For example, when the sequence of the first activity information and the sequence of the second activity information, the sequences each including the start action information and the end action information, correspond to each other, and the time data and the place data of the start action information and the time data and the place data of the end action information of the sequences of the first and second activity information are similar to each other, the episode information with respect to the first activity information and the second activity information may be generated. Here, the episode information may define a statistical value indicating the attributes of the first activity information and the second activity information as a pattern and may have a reliability value with respect to the pattern. The reliability value with respect to the pattern may have a value between 0 and 1.

In addition, the episode information having different patterns may be identified from each other. When there are first to tenth activity information of the same type, and when first episode information generated from the first to fifth activity information and second episode information generated from the sixth to tenth activity information have different patterns from each other, the homogenous first and second episode information may be identified from each other.

According to an embodiment of the disclosure, when the activity information is stored in the episodic memory for a defined time period or by a defined volume, the user device 100 may generate the episode information by analyzing the plurality of pieces of activity information and deriving the pattern indicating the attributes of the plurality of pieces of activity information. The user device 100 may train a defined analysis model by using the plurality of pieces of activity information stored in the episodic memory and may use the analysis model to generate the episode information having the pattern.

FIG. 8A is a diagram illustrating a plurality of pieces of activity information stored in episodic memory according to an embodiment of the disclosure. FIG. 8B is a diagram illustrating episode information stored in personal semantic memory according to an embodiment of the disclosure.

Referring to FIGS. 8A and 8B, the user device 100 may generate the episode information having the pattern by deriving the pattern and the reliability value indicating the attributes of the plurality of pieces of related activity information accumulated in the episodic memory during a defined time period. The user device 100 may perform a statistical analysis on whether there is a repetitive rule or a common aspect with respect to an attendance time, day, or the like, or an average value thereof, by using user's activity information corresponding to commuting to work during a defined time period as a population. The user device 100 may generate the episode information by deriving the pattern and the reliability value with respect to the attendance day and time from the plurality of pieces of activity information corresponding to commuting to work.

Referring to FIG. 8A, the plurality of pieces of activity information corresponding to commuting to work are stored in the episodic memory. In the episodic memory, a start time and an end time of each piece of activity information may be stored. For example, referring to FIG. 8A, it is identified that a user started commuting to work at 08:11:37 a.m. and finished commuting to work at 09:02:42 a.m. on Nov. 12, 2022, started commuting to work at 08:07:18 a.m. and finished commuting to work at 08:59:32 a.m. on Dec. 22, 2022, and started commuting to work at 08:12:45 a.m. and finished commuting to work at 09:05:12 a.m. on Dec. 23, 2022.

Referring to FIG. 8B, it is identified that the episode information having the pattern may be generated from the plurality of pieces of activity information corresponding to commuting to work. For example, referring to FIG. 8B, it is identified that the user starts commuting to work at 08:10:37 a.m. and finishes commuting to work at 09:03:22 a.m. on weekdays, and with respect thereto, the episode information having the reliability value of 0.92 is generated as the pattern ID of "PCW01."

Referring to FIG. 7 again, in operation S740, the user device 100 may manage the generated episode information as a personalized knowledge graph, based on the pattern of the generated episode information. The personalized knowledge graph may provide, as a graph, a personalized knowledge base based on information related to a personal event.

According to an embodiment of the disclosure, the user device 100 may determine a pattern of which episode information of the personalized knowledge graph, pre-stored in personal semantic memory, corresponds to the pattern of the generated episode information. The user device 100 may determine the pattern of which episode information of the personalized knowledge graph corresponds to the pattern of the generated episode information and whether or not the pattern of the generated episode information is within a defined range according to a reliability value with respect to the pattern. For example, when a first parameter value derived as the pattern of first episode information is within the defined range according to the reliability value from a second parameter value derived as the pattern of second episode information of the personalized knowledge graph, the user device 100 may process that the pattern of the first episode information corresponds to the pattern of the second episode information.

Based on a result of the determination, the user device 100 may store the personalized knowledge graph reflecting the generated episode information in the personal semantic memory. When the pattern of the generated episode information corresponds to the pattern of defined episode information of the personalized knowledge graph, the user device 100 may update the episode information of the corresponding pattern, pre-stored in the personal semantic memory, with the generated episode information. For example, when the first episode information with respect to commuting to work based on the activity information corresponding to commuting to work during a month (e.g., commuting to work in January) is stored in the personal semantic memory as the personalized knowledge graph, and when the pattern of the second episode information generated based on the activity information corresponding to commuting to work during a subsequent month (e.g., commuting to work in February) corresponds to the pattern of the first episode information of the personalized knowledge graph, the first episode information may be updated with the second episode information. As a result, the updated episode information based on the activity information corresponding to commuting to work during two months (commuting to work in January and February) may be stored in the personal semantic memory as the personalized knowledge graph.

When the pattern of the generated episode information does not correspond to the pattern of defined episode information of the personalized knowledge graph, the user device 100 may register the generated episode information as new episode information of the personalized knowledge graph and store the new episode information in the personal semantic memory. For example, when the first episode information with respect to commuting to work based on the activity information corresponding to commuting to work during one month (e.g., commuting to work in January) is stored in the personal semantic memory as the personalized knowledge graph, and when the pattern of the second episode information generated based on the activity information corresponding to commuting to work during a subsequent month (e.g., commuting to work in February) does not correspond to the pattern of the first episode information of the personalized knowledge graph, the second episode information may be registered as new episode information of the personalized knowledge graph and stored in the personal semantic memory. As a result, the first episode information with respect to commuting to work based on the activity information corresponding to commuting to work in January and the second episode information with respect to commuting to work based on the activity information corresponding to commuting to work in February each may be separately stored in the personal semantic memory as the personalized knowledge graph.

The user device 100 may manage compression of the episode information stored in the personal semantic memory, by adjusting a degree of matching between the pattern of the generated episode information and the pattern of defined episode information of the personalized knowledge graph. The user device 100 may change the compression level of the episode information stored in the personal semantic memory, based on the matching degree between the pattern of the generated episode information and the pattern of the defined episode information of the personalized knowledge graph. The user device 100 may improve the search speed with respect to the episode information by compressing the episode information stored in the personal semantic memory.

According to an embodiment of the disclosure, the user device 100 may manage routine information including at least one piece of episode information as the personalized knowledge graph, based on the pattern of each piece of episode information stored in the personal semantic memory.

The user device 100 may generate the routine information based on the temporal repeatability of the pattern of each piece of episode information stored in the personal semantic memory. For example, when the first episode information has a pattern of occurring at 9 a.m. every day from Monday to Friday and the second episode information has a pattern of occurring at 6 p.m. every day from Monday to Friday, the routine information including the first episode information and the second episode information may be generated.

The user device 100 may generate the routine information based on the continuity of the sequence of the action information of each piece of episode information stored in the personal semantic memory. For example, when the first episode information includes a first sequence of the action information and the second episode information includes a second sequence of the action information, and when the continuity of the first sequence and the second sequence is recognized, the routine information including the first episode information and the second episode information may be generated.

The user device 100 may generate the routine information based on the possibility of occurrence of each piece of episode information stored in the personal semantic memory under a defined contextual condition. For example, when the first episode information occurs, without exception, at a specific place, the routine information having the specific place as the occurrence condition of the first episode information may be generated.

FIG. 9 is a diagram illustrating generating routine information from episode information stored in personal semantic memory according to an embodiment of the disclosure.

Referring to FIG. 9, the episode information with respect to commuting to work is stored in the personal semantic memory as the pattern ID of "PCW01," and the episode information with respect to commuting to home is stored in the personal semantic memory as the pattern ID of "PCH02." For example, the user device 100 may generate the routine information based on the temporal repeatability of the patterns of the episode information of the pattern ID of "PCW01" and the episode information of the pattern ID of "PCH02" stored in the personal semantic memory. The episode information of the pattern ID of "PCW01" has a pattern of starting commuting to work at around 08:10 a.m. every day and taking 53 minutes of commuting time, and the episode information of the pattern ID of "PCH02" has a pattern of starting commuting to home at around 18:05 p.m. every day and taking 1 hour and 15 minutes of commuting time, and thus, the routine information with respect to commuting for commuting to work and commuting to home, the routine information including the episode information of the pattern ID of "PCW01" and the episode information of the pattern ID of "PCH02," may be generated as the routine ID of "R1."

Referring to FIG. 9, when the episode information of the pattern ID of "PC01" stored in the personal semantic memory includes a first sequence of the action information, the episode information of the pattern ID of "PW02" includes a second sequence of the action information, and when the continuity of the first sequence and the second sequence is recognized, the routine information with respect to all of sequences, for which the continuity is recognized, the routine information including the episode information of "PC01" and the episode information of "PW02," may be generated as the routine ID of "R2."

Referring to FIG. 9, when the episode information of the pattern ID of "PPM01" occurs, without exception, at a specific place, the routine information having the specific place as the occurrence condition of the episode information of the pattern ID of "PPM01" may be generated as the routine ID of "R3."

Figure 10:
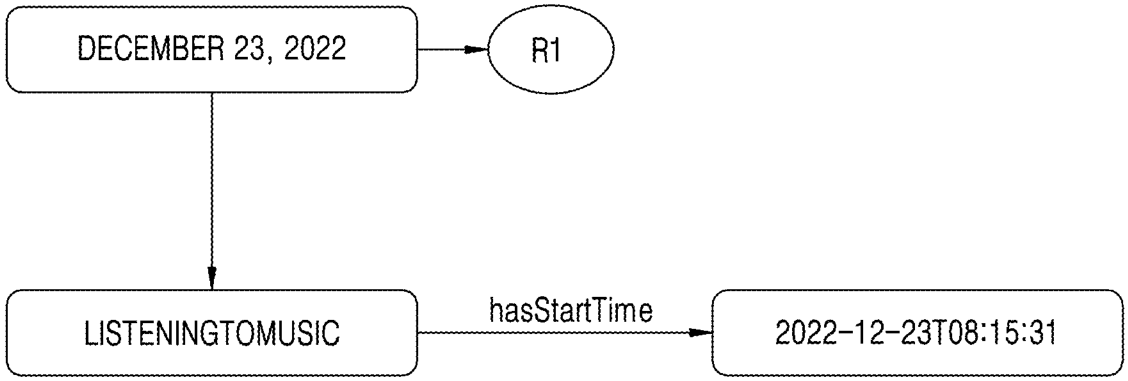
FIG. 10 is a diagram illustrating representing activity information stored in an episodic memory in the form of a knowledge graph with reference to a personalized knowledge graph stored in personal semantic memory according to an embodiment of the disclosure.

FIG. 10 is a diagram illustrating representing, with reference to a personalized knowledge graph stored in personal semantic memory, activity information stored in episodic memory as a knowledge graph according to an embodiment of the disclosure.

Referring to FIG. 10, the user device 100 may represent and store, with reference to the personalized knowledge graph stored in the personal semantic memory, the activity information stored in the episodic memory as the knowledge graph. Based on the example of the plurality of pieces of activity information stored in the episodic memory of FIG. 8A and the episode information stored in the personal semantic memory and the routine information of FIGS. 8B and 9, FIG. 10 represents the activity information of a user on Dec. 23, 2022 as a knowledge graph.

Regarding some data of the episodic memory of FIG. 8A, it is identified that the user started commuting to work at around 08:12 a.m., took about 53 minutes of commuting time, and listened to music from 08:15 to 09:02 on Dec. 23, 2022. Although not represented on the data of the episodic memory of FIG. 8A, it is assumed that the user started commuting to home by leaving the office at around 18:05 p.m. The activity information with respect to commuting of the user for commuting to work and commuting to home may be represented as the knowledge graph, with reference to the routine ID of "R1," which is the routine information with respect to commuting for commuting to work and commuting to home, the routine information including the episode information of the pattern ID of "PCW01" and the episode information of the pattern ID of "PCH02." The activity information of listening to music not processed as the episode information having the pattern may be represented, by itself, as the knowledge graph including nodes and edges.

FIG. 11 is a diagram illustrating managing homogeneous pieces of episode information having different patterns from each other in personal semantic memory according to an embodiment of the disclosure.

Even when pieces of episode information are generated from the same type of activity information, the pieces of episode information having different patterns from each other have to be managed separately. When the pattern of the generated episode information does not correspond to the pattern of the homogeneous episode information of a personalized knowledge graph, the user device 100 may manage each of the pieces of episode information in the personal semantic memory by setting a valid period for each of the generated episode information and the homogeneous episode information.

Referring to FIG. 11, while the episode information of the pattern ID of "PCW01" has a pattern of starting commuting to work at around 08:10 a.m. and arriving at work at around 09:03 a.m. on weekdays, the episode information of the pattern ID of "PCW10" has a pattern of starting commuting to work at around 07:30 a.m. and arriving at work at around 07:55 a.m. on weekdays. When a change has occurred in the activity information with respect to commuting to work of a user, due to a change in a work place, a work, or the like, of the user, the pieces of episode information with respect to commuting to work having the different patterns from each other may be separately generated, as illustrated in FIG. 11. The episode information of the pattern ID of "PCW01" is episode information generated from the past activity information with respect to commuting to work from Mar. 11, 2021 to Apr. 21, 2023, and thus, a time period corresponding to the past may be set as the valid period. The episode information of the pattern ID of "PCW10" is episode information generated from the activity information with respect to commuting to work from Apr. 25, 2023 to the present, and thus, a time period after Apr. 25, 2023 may be set as the valid period.

Referring to FIG. 11, routine information with respect to commuting for commuting to work and commuting to home may be managed in the personal semantic memory as the personalized knowledge graph by being divided into the routine ID of "R1," which is the past routine information from Mar. 11, 2021 to Apr. 21, 2023 and the routine ID of "R10," which is the present routine information.

FIG. 12 is a diagram illustrating managing homogenous pieces of episode information having a plurality of patterns having different probability distributions from each other, in personal semantic memory according to an embodiment of the disclosure.

When generated pieces of episode information have a plurality of patterns having different probability distributions from each other, the user device 100 may manage each of the pieces of episode information respectively corresponding to the plurality of patterns, in the personal semantic memory. For example, when the generated pieces of episode information have a first pattern and a second pattern having different normal distributions from each other, each of the episode information corresponding to the first pattern and the episode information corresponding to the second pattern may be separately managed in the personal semantic memory.

Referring to FIG. 12, while the episode information of the pattern ID of "PCH01" has a pattern of starting commuting to home at around 18:05 p.m. and arriving at home at around 19:21 p.m., the episode information of the pattern ID of "PCH02" has a pattern of starting commuting to home at around 21:12 p.m. and arriving at home at around 22:02 p.m., and each of the patterns may have a normal distribution. Like there are days on weekends, on which a user works overtime and does not, when there is activity information with respect to commuting to home having two different patterns, each piece of episode information with respect to commuting to work having each different pattern may be separately generated and managed in the personal semantic memory, as illustrated in FIG. 12.

Referring to FIG. 12, routine information with respect to commuting for commuting to work and commuting to home may be managed in the personal semantic memory as the personalized knowledge graph by being divided into the routine ID of "R1" including the episode information with respect to commuting to home of the pattern ID of "PCH01" and the routine ID of "R2" including the episode information with respect to commuting to home of the pattern ID of "PCH02."

Figure 13:
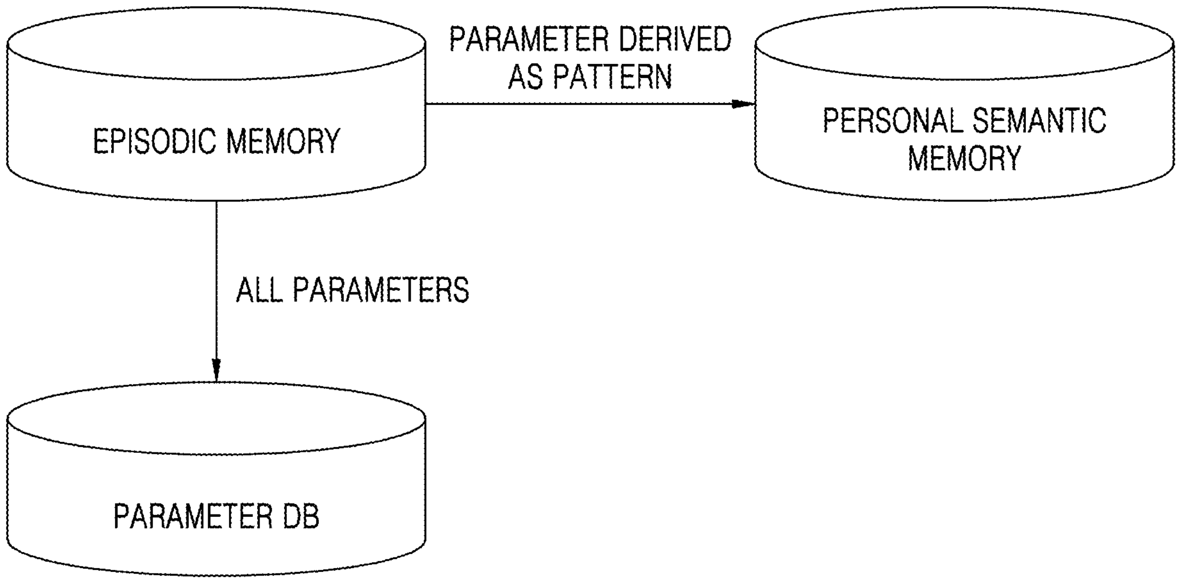
FIG. 13 is a diagram illustrating a management method with respect to a parameter value indicating an attribute with respect to activity information according to an embodiment of the disclosure.

FIG. 13 is a diagram illustrating a method of managing a parameter value indicating an attribute of activity information according to an embodiment of the disclosure.

The activity information may have the parameter indicating the attribute. Parameters may be divided into a parameter derived as a pattern indicating an attribute with respect to a plurality of pieces of related activity information and a parameter irrelevant to the pattern.

Referring to FIG. 13, all parameters of the activity information may be additionally stored in a parameter database. In the parameter database, data of a parameter beyond a defined time period may be deleted. The parameter derived as the pattern of episode information generated based on the plurality of pieces of related activity information may be managed in personal semantic memory. The user device 100 may manage the parameter value derived as the pattern of the episode information, in the personal semantic memory, as preference information with respect to the activity information of a user.

Figure 14:
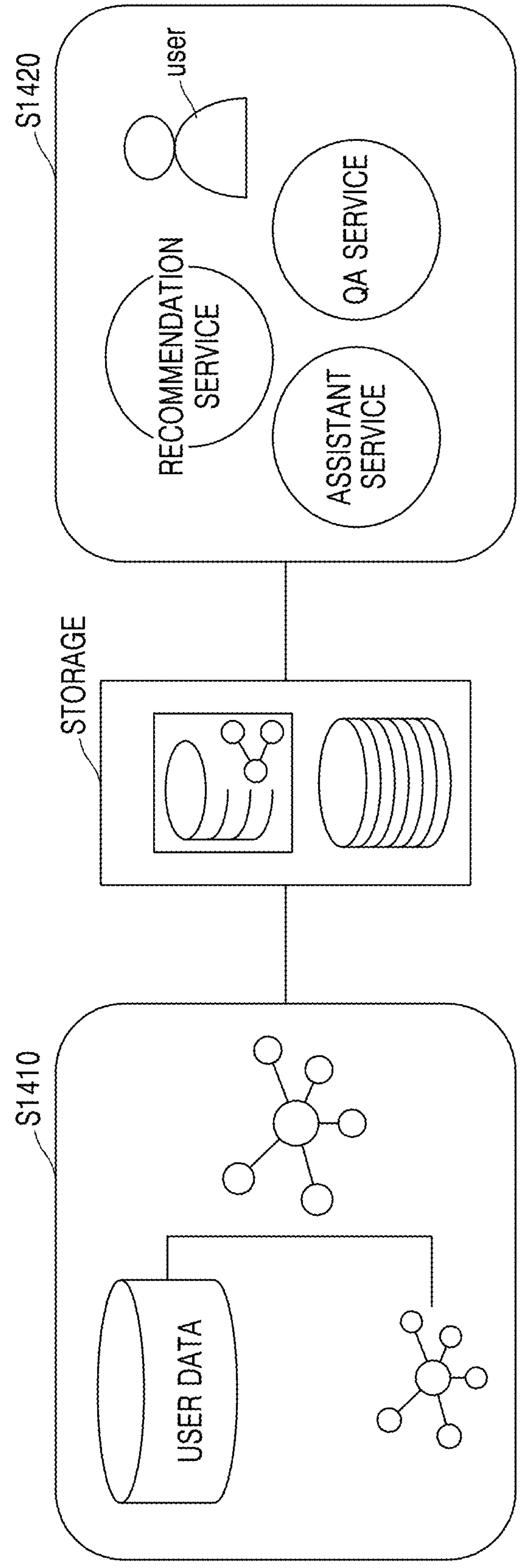
FIG. 14 is a diagram illustrating an artificial intelligence (AI) platform based on a personalized knowledge graph according to an embodiment of the disclosure.

FIG. 14 is a diagram illustrating an AI platform based on a personalized knowledge graph according to an embodiment of the disclosure.

Referring to FIG. 14, the AI platform based on the personalized knowledge graph may be provided to a user through an operation S1410 of establishing a knowledge graph-based personalized database and an operation S1420 of providing a personalized AI service to the user through a knowledge graph-based service application.

In operation S1410 of establishing the knowledge graph-based personalized database, the user device 100 may process, with reference to a knowledge graph in a standardized form, user data obtained by the user device 100 as information of the standardized form. The user device 100 may establish the knowledge graph-based personalized database by converting various types of amorphous data into a knowledge graph form and may store the established knowledge graph-based personalized database in a storage.

In operation S1420 of providing the personalized AI service to the user through the knowledge graph-based service application, the user device 100 may provide various services by using the personalized database stored in the storage. The user device 100 may provide a recommendation service, an assistant service, a question answering (QA) service, or the like, by using the episode information or the routine information stored in the personal semantic memory or the parameter value.

For example, when there is activity information being performed by the user, the user device 100 may recommend the music enjoyed by the user during the activity information being performed, through the recommendation service, or may provide a related past experience through the assistant service. The user device 100 may identify a behavior pattern of the user from the personalized database, and when the user shows a pattern different from a usual behavior pattern, may provide a solution service related to the cause of showing the different pattern, through the recommendation service. The user device 100 may provide a user-personalized answer to a question of the user based on the personalized database, through the QA service. The user device 100 may perform a journaling function of managing and describing a schedule or a special event of the user by using the episodic memory or the personal semantic memory, through the assistant service.

Figure 15:
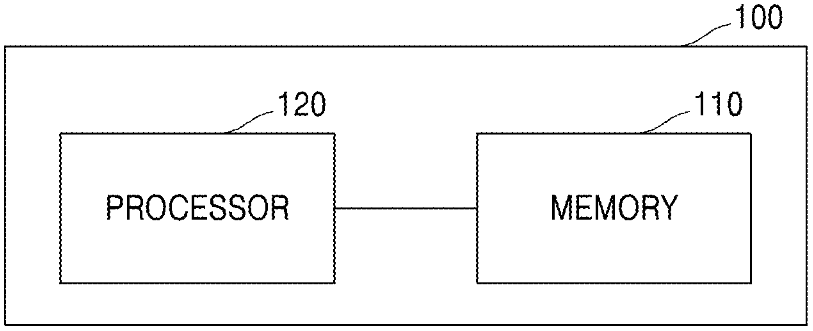
FIG. 15 is a block diagram of a user device according to an embodiment of the disclosure.
Figure 16:
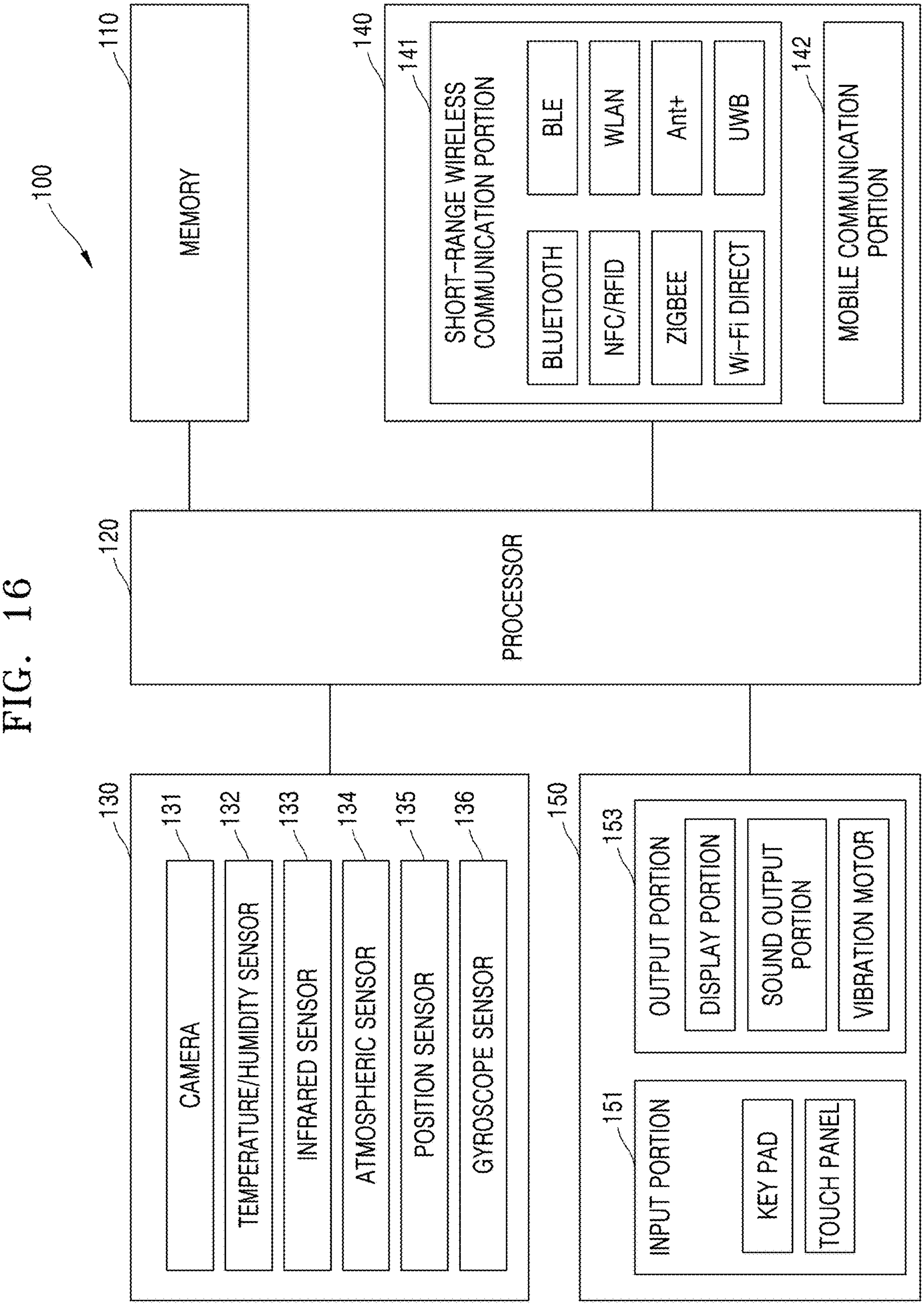
FIG. 16 is a block diagram illustrating a structure and an operation of a user device according to an embodiment of the disclosure.

FIG. 15 is a block diagram of a user device according to an embodiment of the disclosure. FIG. 16 is a block diagram illustrating structures and operations of a user device according to an embodiment of the disclosure.

Referring to FIG. 15, the user device 100 according to an embodiment of the disclosure may include memory 110 and a processor 120, but the user device 100 is not limited thereto and may further include general-use components. Referring to FIG. 16, in addition to the memory 110 and the processor 120, the user device 100 may further include a sensing portion 130, a communication portion 140, and an input and output portion 150. Hereinafter, each of the components is described in detail with reference to FIGS. 15 and 16.

The memory 110 according to an embodiment of the disclosure may store a program for processing and controlling by the processor 120 and may store data and information input into the user device 100 or generated from the user device 100. The memory 110 may store instructions, data structures, and program codes which are readable by the processor 120. Operations performed by the processor 120 may be realized by executing the instructions or the program codes stored in the memory 110.

The memory 110 according to an embodiment of the disclosure may include flash memory type, a hard disk type, a multi-media card micro type, card-type memory (e.g., an secure digital (SD) or extreme digital (XD) memory, or the like) and may include non-volatile memory including at least one of read-only memory (ROM), electrically erasable programmable read-only memory (EEPROM), programmable read-only memory (PROM), magnetic memory, a magnetic disk, or an optical disk and volatile memory, such as random-access memory (RAM) or static random-access memory (SRAM).

The memory 110 according to an embodiment of the disclosure may store one or more instructions and/or programs to control the user device 100 to train a neural network model or use the neural network model.

The processor 120 according to an embodiment of the disclosure may execute the instructions or programmed software modules stored in the memory 110 to control an operation or a function for the user device 100 to perform a task. The processor 120 may be formed of hardware components configured to perform arithmetic, logic, and input and output operations and signal processing. The processor 120 may control overall operations of the user device 100 by executing the one or more instructions stored in the memory 110. The processor 120 may execute the programs stored in the memory 110 to control the sensing portion 130 including at least one sensor, the communication portion 140, and the input and output portion 150.

The processor 120 according to an embodiment of the disclosure may include, for example, at least one of a central processing unit (CPU), a microprocessor, a graphics processing unit (GPU), application specific integrated circuits (ASICs), digital signal processors (DSPs), digital signal processing devices (DSPDs), programmable logic devices (PLDs), field programmable gate arrays (FPGAs), an application processor, a neural processing unit, or an AI-dedicated processor designed to have a hardware structure specialized for processing an AI model, but is not limited thereto. Each of processors included in the processor 120 may be a dedicated processor configured to perform a defined function.

An AI processor according to an embodiment of the disclosure may perform, by using an AI model, computation and control operations for processing a task set to be performed by the user device 100. The AI processor may be formed as an AI-dedicated hardware chip or may be formed as part of a general-purpose processor (for example, a CPU or an AP) or a graphics dedicated processor (for example, a GPU) and loaded on the user device 100.

The sensing portion 130 according to an embodiment of the disclosure may include a plurality of sensors configured to sense information about a peripheral environment of the user device 100. For example, the sensing portion 130 may include a camera 131, a temperature/humidity sensor 132, an infrared sensor 133, an atmospheric sensor 134, a position sensor 135, a gyroscope sensor 136, or the like, but is not limited thereto. A function of each sensor may be intuitively inferred from its one by one of ordinary skill in the art, and thus, is briefly described hereinafter.

The camera 131 according to an embodiment of the disclosure may include a stereo camera, a mono camera, a wide-angle camera, an around-view camera, or a three-dimensional (3D) vision sensor. The temperature/humidity sensor 132 may measure a temperature or humidity of a location in which the user device 100 is located. The infrared sensor 133 may include any one of an active infrared sensor configured to sense a change by copying infrared rays and blocking light and a passive infrared sensor configured to sense only a change of infrared rays received from an outer space without having a laser beam transmitter. The atmospheric sensor 134 may measure atmospheric pressure of a place in which the user device 100 is located. The position sensor 135 may sense a position of the user device 100. For example, the position sensor 135 may include a GPS. The gyroscope sensor 136 may sense angular velocity. The gyroscope sensor 136 may be used to measure a position of the user device 100 and to set a direction of a movement of the user device 100.

The communication portion 140 may include one or more components configured for the user device 100 to communicate with an external device, for example, a server or another electronic device. For example, the communication portion 140 may include a short-range wireless communication portion 141, a mobile communication portion 142, or the like, but is not limited thereto.

The short-range wireless communication portion may include a Bluetooth communication portion, a Bluetooth low energy (BLE) communication portion, a near-field communication portion, a wireless local area network (WLAN) (or wi-fi) communication portion, a Zigbee communication portion, an Ant+ communication portion, a wi-fi direct (WFD) communication portion, an ultra-wideband (UWB) communication portion, an infrared data association (IrDA) communication portion, a microwave (u Wave) communication portion, or the like, but is not limited thereto.

The mobile communication portion 142 may transmit and receive wireless signals to and from at least one of a base station, an external terminal, or a server, on a mobile communication network. Here, the wireless signal may include a sound call signal, a video-telephony call signal, or data of various forms according to transmission and reception of text/a multimedia message.

The input and output portion 150 may include an input portion 151 and an output portion 153. The input and output portion 150 may have the input portion 151 and the output portion 153 which are separated from each other or the input portion 151 and the output portion 153 which are integrated with each other like a touch screen. The input and output portion 150 may receive input information from a user and provide output information to the user.

The input portion 151 may denote a device used by the user to input data for controlling the user device 100. For example, the input portion 151 may include a key pad, a touch panel (a contact capacitance method, a pressure resistive-layer method, an infrared sensing method, a surface ultrasonic conductive method, an integral tension measuring method, a piezo-effect method, or the like), or the like. In addition, the input portion 151 may include a jog wheel, a jog switch, or the like, but is not limited thereto.

The output portion 153 may output an audio signal, a video signal, or a vibration signal, and the output portion 153 may include a display portion, a sound output portion, and a vibration motor. The display portion may display information processed by the user device 100. For example, the display portion may display a user interface to receive manipulation by a user. When the display portion and a touch pad are formed as a touch screen by having a layer structure, the display portion may be used as an input device as well as an output device. The display portion may include at least one of a liquid crystal display, a thin-film transistor-liquid crystal display, an organic light-emitting diode, a flexible display, or a 3D display. According to a form in which the user device 100 is realized, the user device 100 may include at least two display portions. The sound output portion may output audio data stored in the memory 110. The sound output portion may output a sound signal associated with a function performed by the user device 100. The sound output portion may include a speaker, a buzzer, or the like.

The user device 100 according to an embodiment of the disclosure may include the memory 110 storing one or more instructions and the at least one processor 120 operatively connected to the memory 110 and configured to execute the at least one instruction. The processor 120 may be configured to execute the one or more instructions to load and execute an instruction or a code with respect to a defined module.

The processor 120 of the user device 100 according to an embodiment of the disclosure may be configured to manage activity information of a user based on data obtained by the user device 100.

The processor 120 may be configured to execute the one or more instructions to generate action information corresponding to a unit operation of the user, based on the data obtained by the user device 100. According to an embodiment of the disclosure, the processor 120 may be configured to extract the action information matched to the unit operation based on the data obtained by the user device 100, from an action information database of a pre-established knowledge graph. The processor 120 may be configured to compare an embedding vector of the unit operation with an embedding vector of one or more action information candidates in the action information database and perform, based on a result of the comparison, classification of the action information with respect to the unit operation to extract the action information matched to the unit operation. The processor 120 may be configured to determine the extracted action information as the action information corresponding to the unit operation. According to an embodiment of the disclosure, the processor 120 may be configured to generate the action information by inferring second action information according to time information or place information based on the obtained data, when first action information is generated.

The processor 120 may be configured to execute the one or more instructions to generate an activity information candidate corresponding to a sequence including a series of sequential pieces of action information, based on the obtained data or the generated action information. According to an embodiment of the disclosure, the processor 120 may be configured to extract activity information including a sequence of one or more pieces of action information from an activity information database of a pre-established knowledge graph, when the one or more pieces of action information are generated according to the obtained data or the generated action information. The processor 120 may be configured to determine the extracted activity information as the activity information candidate corresponding to the sequence of the one or more pieces of action information.

The processor 120 may be configured to execute the one or more instructions to change the generated activity information candidate according to an update of the obtained data or the generated action information. According to an embodiment of the disclosure, the processor 120 may be configured to extract, from the activity information database of the pre-established knowledge graph, the activity information including a sequence of the action information reflecting an update, according to the update of the obtained data or the generated action information. Based on the activity information database of a hierarchical structure in which layers for arranging pieces of activity information are determined according to higher and lower concepts between the pieces of activity information, the processor 120 may be configured to extract the activity information including the sequence of the action information reflecting the update, as the activity information of a higher concept is specified as the activity information of a lower concept, according to the update of the obtained data or the generated action information. The processor 120 may be configured to determine the extracted activity information as the activity information candidate corresponding to the sequence of the action information reflecting the update.

The processor 120 may be configured to execute the one or more instructions to determine the activity information from the changed activity information candidate, based on a condition to confirm the activity information. According to an embodiment of the disclosure, the processor 120 may be configured to determine the activity information from the activity information candidate for which end action information is generated. According to an embodiment of the disclosure, the processor 120 may be configured to determine the activity information by inferring the activity information from the activity information candidate whose probability, which corresponds to the similarity with the activity information based on the degree of progress of the sequence, satisfies a defined condition, of the changed activity information candidate.

The processor 120 of the user device 100 according to an embodiment of the disclosure may be configured to establish a personalized knowledge base based on the activity information of a user managed by the user device 100.

The processor 120 may be configured to execute the one or more instructions to generate the action information corresponding to the unit operation of the user, based on the data obtained by the user device 100. The processor 120 may be configured to execute the one or more instructions to determine the activity information corresponding to a sequence including a series of sequential pieces of action information. According to an embodiment of the disclosure, the processor 120 may be configured to determine the activity information corresponding to the sequence, by using an activity information database inductively defined based on information related to a user's personal event, stored in personal semantic memory, or an activity information database pre-defined based on semantic information (the common sense or fact knowledge), stored in semantic memory.

The processor 120 may be configured to execute the one or more instructions to generate episode information based on the plurality of pieces of related activity information. According to an embodiment of the disclosure, the processor 120 may be configured to generate the episode information by deriving a parameter value indicating a common attribute with respect to the plurality of pieces of related activity information as a pattern of the episode information and determining a reliability value with respect to the pattern.

The processor 120 may be configured to execute the one or more instructions to manage the generated episode information as a personalized knowledge graph, based on the pattern included in the generated episode information. According to an embodiment of the disclosure, the processor 120 may be configured to determine a pattern of which episode information of the personalized knowledge graph, pre-stored in the personal semantic memory, corresponds to the pattern of the generated episode information. The processor 120 may be configured to determine the pattern of which episode information of the personalized knowledge graph corresponds to the pattern of the generated episode information and whether or not the pattern of the generated episode information is within a defined range according to a reliability value with respect to the pattern. Based on a result of the determining, the processor 120 may be configured to store the personalized knowledge graph reflecting the generated episode information in the personal semantic memory. When the pattern of the generated episode information corresponds to the pattern of defined episode information of the personalized knowledge graph, the processor 120 may be configured to update the episode information of the corresponding pattern, pre-stored in the personal semantic memory, with the generated episode information When the pattern of the generated episode information does not correspond to the pattern of defined episode information of the personalized knowledge graph, the processor 120 may be configured to register the generated episode information as new episode information of the personalized knowledge graph and store the new episode information in the personal semantic memory.

According to an embodiment of the disclosure, the processor 120 may be configured to manage compression of the episode information stored in the personal semantic memory, by adjusting a degree of matching between the pattern of the generated episode information and the pattern of defined episode information of the personalized knowledge graph. The processor 120 may be configured to change the compression level of the episode information stored in the personal semantic memory, based on the matching degree between the pattern of the generated episode information and the pattern of the defined episode information of the personalized knowledge graph. The processor 120 may be configured to improve the search speed by the user device 100 with respect to the episode information, by compressing the episode information stored in the personal semantic memory.

According to an embodiment of the disclosure, the processor 120 may be configured to manage routine information including at least one piece of episode information as the personalized knowledge graph, based on the pattern of each piece of episode information stored in the personal semantic memory.

According to an embodiment of the disclosure, when the pattern of the generated episode information does not correspond to the pattern of the homogeneous episode information of the personalized knowledge graph, the processor 120 may be configured to manage each of the pieces of episode information in the personal semantic memory by setting a valid period for each of the generated episode information and the homogeneous episode information.

According to an embodiment of the disclosure, when generated pieces of episode information have a plurality of patterns having different probability distributions from each other, the processor 120 may be configured to manage each of the pieces of episode information respectively corresponding to the plurality of patterns, in the personal semantic memory.

According to an embodiment of the disclosure, the processor 120 may be configured to manage the parameter value derived as the pattern of the episode information, in the personal semantic memory, as preference information with respect to the activity information of a user.

Figure 17:
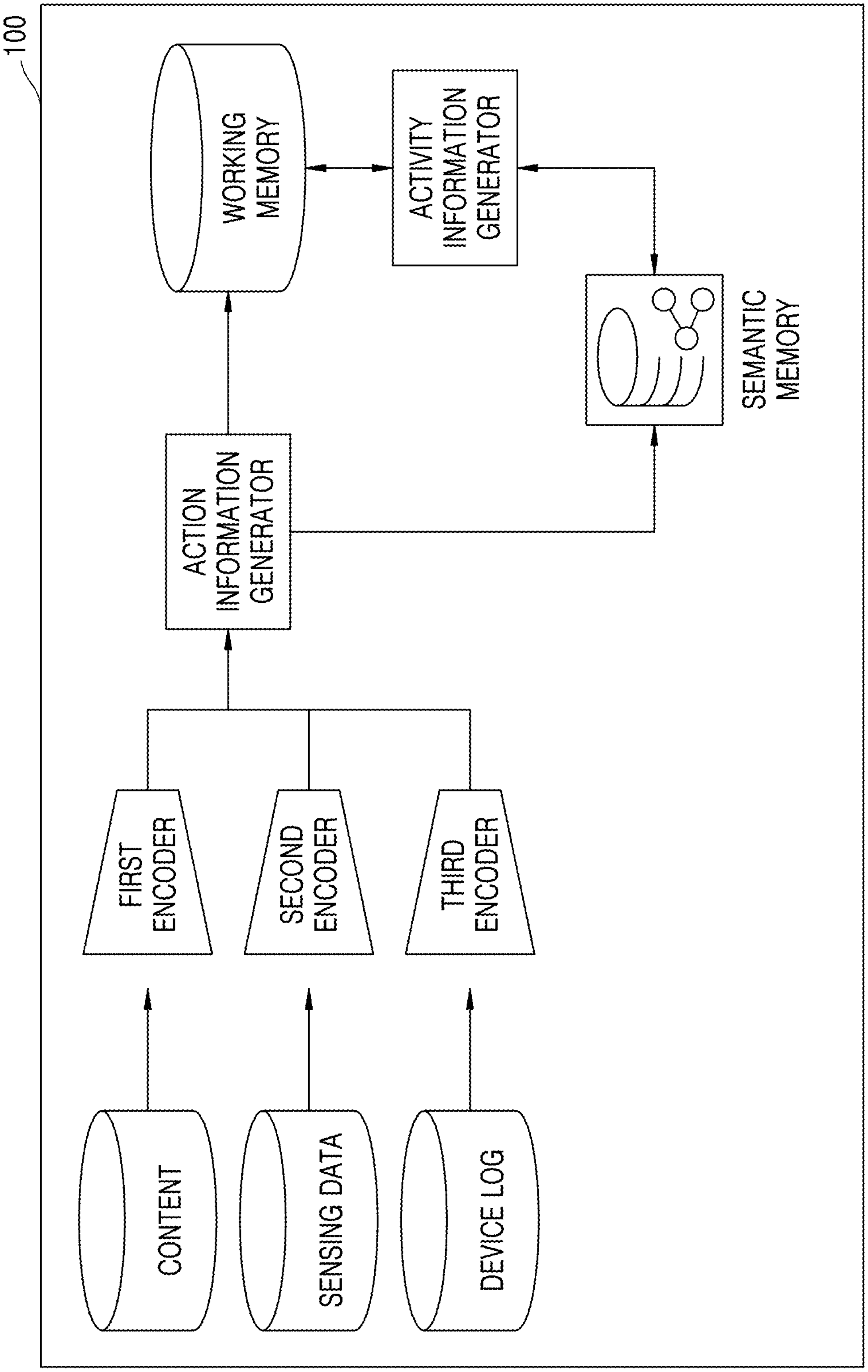
FIG. 17 is a diagram illustrating a process of managing action information and activity information in a user device according to an embodiment of the disclosure.

FIG. 17 is a diagram illustrating a process of managing action information and activity information in a user device 100 according to an embodiment of the disclosure.

Referring to FIG. 17, an embedding vector of a unit operation of a user may be obtained by a first encoder from metadata with respect to content, such as text, picture, image, music, or the like, obtained by the user device 100, or data corresponding to the time or place related to the content. The embedding vector of the unit operation of the user may be obtained by a second encoder from sensing data sensed from at least one sensor included in the user device 100. The embedding vector of the unit operation of the user may be obtained by a third encoder from metadata or use log data with respect to a used application or log data with respect to time or place of an event occurrence, or the like.

An action information generator may refer to semantic information in a standardized form stored in semantic memory, to process amorphous data obtained by the user device 100 as information in a standardized form and store the information in the standardized form in working memory. The action information generator may compare the embedding vector of the unit operation of the user obtained by at least one encoder with an embedding vector of one or more action information candidates in the action information database of the pre-established knowledge graph. The action information generator may extract, according to a result of the comparison between the embedding vectors, the action information matched to the unit operation of the user from the action information database of the pre-established knowledge graph. The action information generator may convert various types of amorphous data into the form of a knowledge graph and store the data in the working memory. The action information generator may store the generated action information in the working memory.

An activity information generator may determine whether or not the activity information is determined from the activity information candidate corresponding to the sequence of the action information stored in the working memory. The activity information generator may extract the activity information corresponding to the sequence of the action information, by using the activity information database stored in the semantic memory or the personal semantic memory. When the activity information is determined, the activity information generator may perform a control operation to delete the activity information candidate managed in the working memory, the activity information candidate being related to the determined activity information, and to store and manage the activity information in the episodic memory. The activity information generator may track the activity information in an ongoing state based on the sequence of a series of successive pieces of action information, and may delete the activity information that is completed, from the working memory.

Figure 18:
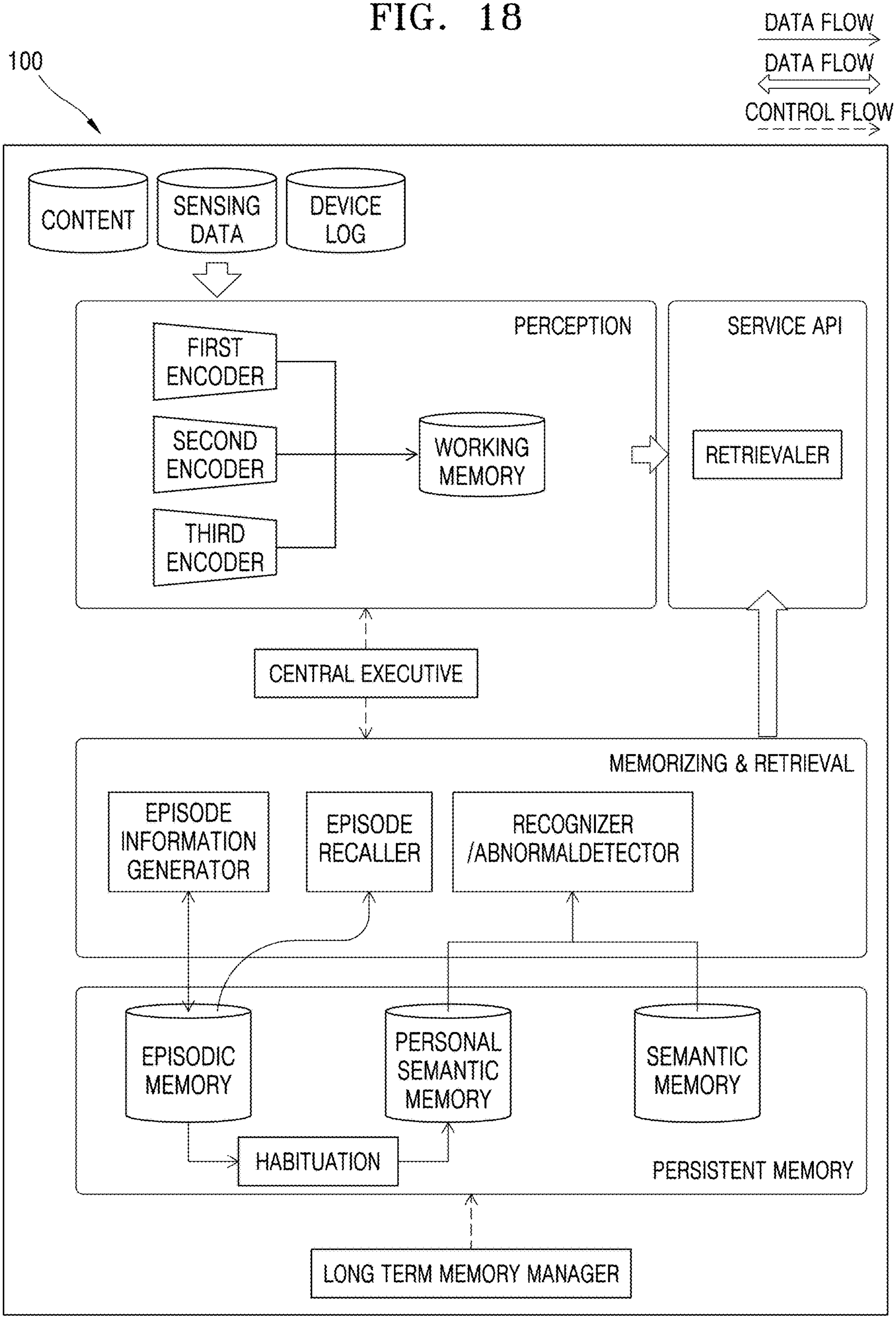
FIG. 18 is a diagram illustrating a process of establishing a personalized database based on activity information in a user device according to an embodiment of the disclosure.

FIG. 18 is a diagram illustrating a process of establishing a personalized database based on activity information in a user device 100 according to an embodiment of the disclosure.

Referring to FIG. 18, the user device 100 may include first memory including the working memory. The action information generated through the first encoder, the second encoder, the third encoder, and a central executive may be stored in the working memory. The user device 100 may include second memory, which is persistent memory including the episodic memory, the personal semantic memory, and the semantic memory. A long term memory manager may manage a policy of the episodic memory, the personal semantic memory, and the semantic memory included in the second memory or a database of a pre-established knowledge graph.

The user device 100 may delete the completed activity information from the working memory and may store and manage the completed activity information by using the episodic memory and the personal semantic memory. An episode information generator may generate the episode information based on a plurality of pieces of related activity information from among the plurality of pieces of activity information accumulated in the episodic memory. The episode information generator may generate the episode information by deriving the common attribute with respect to the plurality of pieces of related activity information as the pattern and determining the reliability value with respect to the pattern. The generated episode information may be managed in the personal semantic memory as the personalized knowledge graph, based on the pattern included in the generated episode information. The routine information including at least one piece of episode information may be managed in the personal semantic memory as the personalized knowledge graph, based on the pattern included in each piece of episode information stored in the personal semantic memory. The user device 100 may establish the personalized database based on the activity information of the user managed by the user device 100. An episode information recaller may recall the information stored in the episodic memory and a recognizer may recall the information stored in the personal semantic memory or the semantic memory.

An embodiment of the disclosure may be implemented as a recording medium including an instruction executable by a computer, such as a program module executable by a computer. Computer-readable recording media may be an arbitrary available medium accessible by a computer and includes all of volatile and non-volatile media and detachable and non-detachable media. In addition, the computer-readable media may include computer storage media and communication media. The computer storage media include all of volatile and non-volatile media and detachable and non-detachable media that are realized by an arbitrary method or technique for storing information, such as computer-readable instructions, data structures, program modules, or other data. The communication media may generally include other data of a modulated data signal, such as a computer-readable instruction, a data structure, or a program module.

In addition, the computer-readable storage media may be provided in a form of a non-transitory storage medium. Here, the term "non-transitory storage media" only denotes that the media are tangible devices and do not include signals (e.g., electromagnetic waves), and does not distinguish the storage media semi-permanently storing data and the storage media temporarily storing data. For example, the "non-transitory storage media" may include a buffer temporarily storing data.

According to an embodiment of the disclosure, the method according to an embodiment of the disclosure may be provided as an inclusion of a computer program product. The computer program product may be, as a product, transacted between a seller and a purchaser. The computer program product may be distributed in the form of a machine-readable storage medium (e.g., a CD-ROM) or may be distributed online (e.g., downloaded or uploaded) through an application store or directly between two user devices (e.g., smartphones). In the case of online distribution, at least part of a computer program product (e.g., a downloadable application) may be at least temporarily stored in a machine-readable storage medium, such as memory of a server of a manufacturer, memory of a server of an application store, or memory of a relay server, or may be temporarily generated.

According to an embodiment of the disclosure, a computer-readable recording medium having recorded thereon a program for executing the method of managing the activity information in the user device and the method of establishing the database based on the activity information is provided.

According to an embodiment of the disclosure, a method of establishing a personalized database based on activity information is provided. The method of establishing the personalized database based on the activity information may include generating action information corresponding to a unit operation of a user, based on data obtained by a user device. The method of establishing the personalized database based on the activity information may include determining the activity information corresponding to a sequence including a series of sequential pieces of action information. The method of establishing the personalized database based on the activity information may include generating episode information based on a plurality of pieces of related activity information. The method of establishing the personalized database based on the activity information may include managing the generated episode information as a personalized knowledge graph, based on a pattern of the generated episode information.

According to an embodiment of the disclosure, the generating of the episode information may include generating the episode information by deriving a common attribute with respect to the plurality of pieces of related activity information as the pattern and determining a reliability value with respect to the pattern.

According to an embodiment of the disclosure, the managing of the generated episode information as the personalized knowledge graph may include determining a pattern of which episode information of the personalized knowledge graph, pre-stored in personal semantic memory, corresponds to the pattern of the generated episode information. The managing of the generated episode information as the personalized knowledge graph may include, based on a result of the determining, storing the personalized knowledge graph reflecting the generated episode information in the personal semantic memory.

The determining with respect to the pattern of which episode information of the personalized knowledge graph corresponds to the pattern of the generated episode information may include determining the pattern of which episode information of the personalized knowledge graph corresponds to the pattern of the generated episode information and whether or not the pattern of the generated episode information is within a defined range according to a reliability value with respect to the pattern.

The storing of the personalized knowledge graph reflecting the generated episode information in the personal semantic memory may include, when the pattern of the generated episode information corresponds to the pattern of any episode information of the personalized knowledge graph, updating the episode information of the corresponding pattern, pre-stored in the personal semantic memory, with the generated episode information. Also, the storing of the personalized knowledge graph reflecting the generated episode information in the personal semantic memory may include, when the pattern of the generated episode information does not correspond to the pattern of the defined episode information of the personalized knowledge graph, storing the generated episode information in the personal semantic memory by registering the generated episode information as new episode information of the personalized knowledge graph.

According to an embodiment of the disclosure, the managing of the generated episode information as the personalized knowledge graph may include managing routine information including at least one piece of episode information as the personalized knowledge graph, based on the pattern of each piece of episode information stored in the personal semantic memory.

According to an embodiment of the disclosure, the managing of the generated episode information as the personalized knowledge graph may include, when the pattern of the generated episode information does not correspond to a pattern of homogeneous episode information of the personalized knowledge graph, managing each of the generated episode information and the homogeneous episode information in the personal semantic memory by setting a valid period for each of the generated episode information and the homogeneous episode information.

According to an embodiment of the disclosure, the managing of the generated episode information as the personalized knowledge graph may include, when the generated episode information includes a plurality of patterns including different probability distributions from each other, managing each of pieces of episode information respectively corresponding to the plurality of patterns, in the personal semantic memory.

According to an embodiment of the disclosure, the managing of the generated episode information as the personalized knowledge graph may include managing, in the personal semantic memory, a parameter value derived as a defined pattern of the episode information, as preference information with respect to the activity information of the user.

According to an embodiment of the disclosure, a computer-readable recording medium having recorded thereon a program for executing the method of establishing the personalized database based on the activity information is provided.

According to an embodiment of the disclosure, a user device 100 for establishing a personalized database based on activity information is provided. The user device 100 may include memory 110 storing at least one instruction and at least one processor 120 operatively connected to the memory 110 and configured to execute the at least one instruction. The at least one processor 120 may be configured to execute the at least one instruction to generate action information corresponding to a unit operation of a user, based on data obtained by the user device 100. The at least one processor 120 may be configured to execute the at least one instruction to determine activity information corresponding to a sequence including a series of sequential pieces of action information. The at least one processor 120 may be configured to execute the at least one instruction to generate episode information based on a plurality of pieces of related activity information. The at least one processor 120 may be configured to execute the at least one instruction to manage the generated episode information as a personalized knowledge graph, based on a pattern of the generated episode information.

According to an embodiment of the disclosure, the at least one processor 120 may further be configured to execute the at least one instruction to generate the episode information by deriving a common attribute with respect to the plurality of pieces of related activity information as the pattern and determining a reliability value with respect to the pattern.

According to an embodiment of the disclosure, the at least one processor 120 may further be configured to execute the at least one instruction to determine a pattern of which episode information of the personalized knowledge graph, pre-stored in personal semantic memory, corresponds to the pattern of the generated episode information, and based on a result of the determining, store the personalized knowledge graph reflecting the generated episode information in the personal semantic memory.

According to an embodiment of the disclosure, the at least one processor 120 may further be configured to execute the at least one instruction to determine the pattern of which episode information of the personalized knowledge graph corresponds to the pattern of the generated episode information and whether or not the pattern of the generated episode information is within a defined range according to a reliability value with respect to the pattern.

According to an embodiment of the disclosure, the at least one processor 120 may further be configured to execute the at least one instruction to, when the pattern of the generated episode information corresponds to the pattern of any episode information of the personalized knowledge graph, update the episode information of the corresponding pattern, pre-stored in the personal semantic memory, with the generated episode information. According to an embodiment of the disclosure, the at least one processor 120 may further be configured to execute the at least one instruction to, when the pattern of the generated episode information does not correspond to the pattern of the defined episode information of the personalized knowledge graph, store the generated episode information in the personal semantic memory by registering the generated episode information as new episode information of the personalized knowledge graph.

According to an embodiment of the disclosure, the at least one processor 120 may further be configured to execute the at least one instruction to manage compression of the episode information stored in the personal semantic memory, by adjusting a degree of matching between the pattern of the generated episode information and the pattern of the defined episode information of the personalized knowledge graph.

According to an embodiment of the disclosure, the at least one processor 120 may further be configured to execute the at least one instruction to manage routine information including at least one piece of episode information as the personalized knowledge graph, based on the pattern of each piece of episode information stored in the personal semantic memory.

According to an embodiment of the disclosure, the at least one processor 120 may further be configured to execute the at least one instruction to, when the pattern of the generated episode information does not correspond to a pattern of homogeneous episode information of the personalized knowledge graph, manage each of the generated episode information and the homogeneous episode information in the personal semantic memory by setting a valid period for each of the generated episode information and the homogeneous episode information.

According to an embodiment of the disclosure, the at least one processor 120 may further be configured to execute the at least one instruction to, when the generated episode information includes a plurality of patterns including different probability distributions from each other, manage each of pieces of episode information respectively corresponding to the plurality of patterns, in the personal semantic memory.

According to an embodiment of the disclosure, the at least one processor 120 may further be configured to execute the at least one instruction to manage, in the personal semantic memory, a parameter value derived as a defined pattern of the episode information, as preference information with respect to the activity information of the user.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user device, the method comprising:

managing a personalized database, the managing of the personalized database including:

generating action information corresponding to a unit operation of a user by extracting, from an action information database of a pre-established knowledge graph, the action information matched to the unit operation of the user analyzed based on data obtained by the user device;

determining activity information, from an activity information database of a knowledge graph defined based on at least one of semantic information or information related to a user's personal event, corresponding to a sequence comprising a series of sequential pieces of action information;

generating episode information based on a plurality of pieces of related activity information from among a plurality of pieces of the determined activity information;

managing the generated episode information as a personalized knowledge graph, based on a pattern of the generated episode information, the managing of the generated episode information including:

determining a pattern of which episode information of the personalized knowledge graph, pre-stored in personal semantic memory, corresponds to the pattern of the generated episode information; and based on a result of the determining, storing the personalized knowledge graph reflecting the generated episode information in the personal semantic memory; and managing compression of the episode information stored in the personal semantic memory, by adjusting a degree of matching between the pattern of the generated episode information and the pattern of the episode information of the personalized knowledge graph; and providing a personalized service using the personalized database, the providing of the personalized service using the personalized database including:

outputting, to the user via the user device, content provided by the personalized service that is based on the personalized service using the personalized database.

2. The method of claim 1, wherein the generating of the episode information comprises:

generating the episode information by deriving a common attribute with respect to the plurality of pieces of related activity information as the pattern and determining a reliability value with respect to the pattern.

3. The method of claim 1, wherein the determining of the pattern comprises:

determining the pattern of which episode information of the personalized knowledge graph corresponds to the pattern of the generated episode information and whether or not the pattern of the generated episode information is within a defined range according to a reliability value with respect to the pattern.

4. The method of claim 1, wherein the storing of the personalized knowledge graph reflecting the generated episode information in the personal semantic memory comprises:

when the pattern of the generated episode information corresponds to the pattern of any episode information of the personalized knowledge graph, updating the episode information of the corresponding pattern, pre-stored in the personal semantic memory, with the generated episode information; and when the pattern of the generated episode information does not correspond to the pattern of any episode information of the personalized knowledge graph, storing the generated episode information in the personal semantic memory by registering the generated episode information as new episode information of the personalized knowledge graph.

5. The method of claim 1, wherein the managing of the generated episode information as the personalized knowledge graph comprises:

managing routine information comprising at least one piece of episode information as the personalized knowledge graph, based on the pattern of each piece of episode information stored in the personal semantic memory.

6. The method of claim 1, wherein the managing of the generated episode information as the personalized knowledge graph comprises:

when the pattern of the generated episode information does not correspond to a pattern of homogeneous episode information of the personalized knowledge graph, managing each of the generated episode information and the homogeneous episode information in the personal semantic memory by setting a valid period for each of the generated episode information and the homogeneous episode information.

7. The method of claim 1, wherein the managing of the generated episode information as the personalized knowledge graph comprises:

when the generated episode information comprises a plurality of patterns comprising different probability distributions from each other, managing each of pieces of episode information respectively corresponding to the plurality of patterns, in the personal semantic memory.

8. The method of claim 1, wherein the managing of the generated episode information as the personalized knowledge graph comprises:

managing, in the personal semantic memory, a parameter value derived as a defined pattern of the episode information, as preference information with respect to the activity information of the user.

9. One or more non-transitory computer-readable storage media storing computer-executable instructions that, when executed by one or more processors of a user device individually or collectively, cause the user device to perform operations, the operations comprising:

managing a personalized database, the managing of the personalized database including:

generating action information corresponding to a unit operation of a user by extracting, from an action information database of a pre-established knowledge graph, the action information matched to the unit operation of the user analyzed based on data obtained by the user device;

determining activity information, from an activity information database of a knowledge graph defined based on at least one of semantic information or information related to a user's personal event, corresponding to a sequence comprising a series of sequential pieces of action information;

generating episode information based on a plurality of pieces of related activity information from among a plurality of pieces of the determined activity information;

managing the generated episode information as a personalized knowledge graph, based on a pattern of the generated episode information, the managing of the generated episode information including:

determining a pattern of which episode information of the personalized knowledge graph, pre-stored in personal semantic memory, corresponds to the pattern of the generated episode information; and based on a result of the determining, storing the personalized knowledge graph reflecting the generated episode information in the personal semantic memory; and managing compression of the episode information stored in the personal semantic memory, by adjusting a degree of matching between the pattern of the generated episode information and the pattern of the episode information of the personalized knowledge graph; and providing a personalized service using the personalized database, the providing of the personalized service using the personalized database including:

outputting, to the user via the user device, content provided by the personalized service that is based on the personalized service using the personalized database.

10. A user device comprising:

memory storing one or more computer programs; and one or more processors communicatively coupled to the memory, wherein the one or more computer programs include computer-executable instructions that, when executed by the one or more processors individually or collectively, cause the user device to:

manage a personalized database, and provide a personalized service using the personalized database, wherein, to manage the personalized database, the one or more computer programs further include computer-executable instructions that, when executed by the one or more processors individually or collectively, cause the user device to:

generate action information corresponding to a unit operation of a user by extracting, from an action information database of a pre-established knowledge graph, the action information matched to the unit operation of the user analyzed based on data obtained by the user device, determine activity information, from an activity information database of a knowledge graph defined based on at least one of semantic information or information related to a user's personal event, corresponding to a sequence comprising a series of sequential pieces of action information, generate episode information based on a plurality of pieces of related activity information from among a plurality of pieces of the determined activity information, and manage the generated episode information as a personalized knowledge graph, based on a pattern of the generated episode information, wherein, to manage the generated episode information, the one or more computer programs further include computer-executable instructions that, when executed by the one or more processors individually or collectively cause the user device to:

determine a pattern of which episode information of the personalized knowledge graph, pre-stored in personal semantic memory, corresponds to the pattern of the generated episode information, and based on a result of the determining, store the personalized knowledge graph reflecting the generated episode information in the personal semantic memory, wherein compression of the episode information stored in the personal semantic memory is managed, by adjusting a degree of matching between the pattern of the generated episode information and the pattern of the episode information of the personalized knowledge graph, and wherein, to provide the personalized service using the personalized database, the one or more computer programs further include computer-executable instructions that, when executed by the one or more processors individually or collectively, cause the user device to:

output, to the user, content provided by the personalized service that is based on the personalized service using the personalized database.

11. The user device of claim 10, wherein, to generate the episode information, the one or more computer programs further include computer-executable instructions that, when executed by the one or more processors individually or collectively, cause the user device to:

generate the episode information by deriving a common attribute with respect to the plurality of pieces of related activity information as the pattern and determining a reliability value with respect to the pattern.

12. The user device of claim 10, wherein, to determine the pattern, the one or more computer programs further include computer-executable instructions that, when executed by the one or more processors individually or collectively, cause the user device to:

determine the pattern of which episode information of the personalized knowledge graph corresponds to the pattern of the generated episode information and whether or not the pattern of the generated episode information is within a defined range according to a reliability value with respect to the pattern.

13. The user device of claim 10, wherein, to store the personalized knowledge graph reflecting the generated episode information in the personal semantic memory, the one or more computer programs further include computer-executable instructions that, when executed by the one or more processors individually or collectively cause the user device to:

when the pattern of the generated episode information corresponds to the pattern of any episode information of the personalized knowledge graph, update the episode information of the corresponding pattern, pre-stored in the personal semantic memory, with the generated episode information, and when the pattern of the generated episode information does not correspond to the pattern of any episode information of the personalized knowledge graph, store the generated episode information in the personal semantic memory by registering the generated episode information as new episode information of the personalized knowledge graph.

14. The user device of claim 10, wherein, to manage the generated episode information as the personalized knowledge graph, the one or more computer programs further include computer-executable instructions that, when executed by the one or more processors individually or collectively, cause the user device to:

manage routine information comprising at least one piece of episode information as the personalized knowledge graph, based on the pattern of each piece of episode information stored in the personal semantic memory.

15. The user device of claim 10, wherein, to manage the generated episode information as the personalized knowledge graph, the one or more computer programs further include computer-executable instructions that, when executed by the one or more processors individually or collectively, cause the user device to:

when the pattern of the generated episode information does not correspond to a pattern of homogeneous episode information of the personalized knowledge graph, manage each of the generated episode information and the homogeneous episode information in the personal semantic memory by setting a valid period for each of the generated episode information and the homogeneous episode information.

16. The user device of claim 10, wherein, to manage the generated episode information as the personalized knowledge graph, the one or more computer programs further include computer-executable instructions that, when executed by the one or more processors individually or collectively, cause the user device to:

when the generated episode information comprises a plurality of patterns comprising different probability distributions from each other, manage each of pieces of episode information respectively corresponding to the plurality of patterns, in the personal semantic memory.

17. The user device of claim 10, wherein, to manage the generated episode information as the personalized knowledge graph, the one or more computer programs further include computer-executable instructions that, when executed by the one or more processors individually or collectively, cause the user device to:

manage, in the personal semantic memory, a parameter value derived as a defined pattern of the episode information, as preference information with respect to the activity information of the user.

* * * * *